(12) United States Patent
Karpinskyy et al.

(10) Patent No.: US 11,651,071 B2
(45) Date of Patent: May 16, 2023

(54) APPARATUS AND METHODS FOR DETECTING INVASIVE ATTACKS WITHIN INTEGRATED CIRCUITS

(71) Applicant: Samsung Electronics Co., Ltd., Suwon-si (KR)

(72) Inventors: Bohdan Karpinskyy, Suwon-si (KR); Mijung Noh, Yongin-si (KR); Jieun Park, Suwon-si (KR); Yongki Lee, Suwon-si (KR); Juyeon Lee, Suwon-si (KR)

(73) Assignee: Samsung Electronics Co., Ltd.

( * ) Notice: Subject to any disclaimer, the term of this patent is extended or adjusted under 35 U.S.C. 154(b) by 323 days.

(21) Appl. No.: 17/003,313

(22) Filed: Aug. 26, 2020

(65) Prior Publication Data

US 2021/0216626 A1 Jul. 15, 2021

(30) Foreign Application Priority Data

Jan. 9, 2020 (KR) ........................ 10-2020-0003185

(51) Int. Cl.
*G06F 21/55* (2013.01)
*G06F 7/58* (2006.01)
*H03K 3/84* (2006.01)
*H03K 19/20* (2006.01)
*H03K 19/21* (2006.01)

(52) U.S. Cl.
CPC ............ *G06F 21/552* (2013.01); *G06F 7/582* (2013.01); *G06F 7/588* (2013.01); *H03K 3/84* (2013.01); *G06F 2221/034* (2013.01); *H03K 19/20* (2013.01); *H03K 19/21* (2013.01)

(58) Field of Classification Search
CPC ........ G06F 21/552; G06F 7/588; G06F 7/582; H03K 3/84
See application file for complete search history.

(56) References Cited

U.S. PATENT DOCUMENTS

| 5,861,662 | A | 1/1999 | Candelore |
| 6,962,294 | B2 | 11/2005 | Beit-Grogger et al. |
| 7,622,944 | B2 | 11/2009 | Ziomek |
| 9,330,255 | B2 * | 5/2016 | Shroff ................... G06F 21/567 |
| 9,634,835 | B2 * | 4/2017 | Legré ..................... H04L 9/002 |

(Continued)

FOREIGN PATENT DOCUMENTS

EP 2624296 8/2013

OTHER PUBLICATIONS

Cioranesco et al. "Cryptographically secure shields" 2014 IEEE International Symposium on Hardware-Oriented Security and Trust (HOST) (9 pages) (May 2014).

*Primary Examiner* — Viral S Lakhia
(74) *Attorney, Agent, or Firm* — Myers Bigel, P.A.

(57) ABSTRACT

An apparatus includes an integrated circuit and a plurality of conducting wires disposed on the integrated circuit. The integrated circuit includes: (i) a signal generation circuit, which is configured to generate random signal and selection signal based on random or pseudo-random numbers, (ii) a transmitting circuit configured to select at least one from among the plurality of conducting wires based on the selection signal and to output the random signal through the at least one conducting wire, and (iii) a receiving circuit configured to detect an invasive attack on the integrated circuit based on signal received through the at least one conducting wire.

19 Claims, 19 Drawing Sheets

(56) References Cited

U.S. PATENT DOCUMENTS

| | | | |
|---|---|---|---|
| 9,813,232 B2* | 11/2017 | Katayama | G06F 7/523 |
| 9,946,899 B1* | 4/2018 | Wesson | H01L 23/576 |
| 10,069,805 B1* | 9/2018 | Carlson | H03K 19/1776 |
| 11,419,046 B2* | 8/2022 | Fiorese | H04L 63/108 |
| 2003/0132777 A1 | 7/2003 | Laackmann et al. | |
| 2006/0261796 A1* | 11/2006 | Park | G05F 1/565 |
| | | | 323/312 |
| 2008/0244749 A1 | 10/2008 | Derouet | |
| 2013/0104252 A1* | 4/2013 | Yanamadala | G06F 21/76 |
| | | | 726/34 |
| 2014/0191781 A1 | 7/2014 | Guvenc | |
| 2015/0154418 A1* | 6/2015 | Redberg | H04L 9/0631 |
| | | | 713/165 |
| 2018/0012849 A1 | 1/2018 | Kim et al. | |
| 2018/0097613 A1* | 4/2018 | Sugahara | H04L 9/0662 |
| 2018/0107845 A1* | 4/2018 | Wesson | G06F 21/50 |
| 2018/0166399 A1* | 6/2018 | Tehranipoor | G06F 21/87 |
| 2020/0050430 A1* | 2/2020 | Näslund | G06F 7/588 |
| 2020/0395315 A1* | 12/2020 | Kang | H01L 23/576 |
| 2021/0124849 A1* | 4/2021 | Delshadpour | G06K 19/07372 |

* cited by examiner

APPARATUS AND METHODS FOR DETECTING INVASIVE ATTACKS WITHIN INTEGRATED CIRCUITS

REFERENCE TO PRIORITY APPLICATION

The application claims the benefit of Korean Patent Application No. 10-2020-0003185, filed Jan. 9, 2020, the disclosure of which is hereby incorporated herein by reference.

BACKGROUND

The inventive concepts relate to technologies for protecting integrated circuits from hacking and other inappropriate attacks and, more particularly, to an apparatus and methods for detecting invasive attacks.

In order to extract security information from an integrated circuit, such as information stored in the integrated circuit and/or information about operations performed by the integrated circuit, invasive attacks on the integrated circuit may be launched. For example, attackers may attempt to obtain the security information by probing after dismantling a device including the integrated circuit, such as a semiconductor device, and powering the integrated circuit. Some semiconductor devices may be designed to include structures for detecting invasive attacks by detecting such dismantling, but newer invasive attack strategies are being developed to neutralize the structures for detecting such dismantling. Accordingly, structures for detecting invasive attacks may be required to have higher performance characteristics, which are sufficient to detect more advanced invasive attacks, while still maintaining high efficiency, such as high flexibility, low power consumption, small area, etc.

SUMMARY

The inventive concepts provide apparatus and methods for effectively detecting advanced invasive attacks.

According to an aspect of the inventive concept, there is provided an apparatus including an integrated circuit and a plurality of conducting wires disposed on the integrated circuit. The integrated circuit includes: (i) a signal generation circuit configured to generate a random signal and selection signal based on random or pseudo-random numbers, (ii) a transmitting circuit configured to select at least one from among the plurality of conducting wires based on the selection signal and to output the random signal through the at least one conducting wire, and (iii) a receiving circuit configured to detect an invasive attack on the integrated circuit based on a signal received through the at least one conducting wire.

According to another aspect of the inventive concept, there is provided an apparatus, which includes an integrated circuit and a plurality of conducting wires disposed on the integrated circuit. The integrated circuit includes: (i) a signal generation circuit configured to generate a random signal and a selection signal based on random or pseudo-random numbers, (ii) a transmitting circuit including a plurality of demultiplexers, which are each configured to select one from among the plurality of conducting wires based on the selection signal and to output one bit of the random signal through the selected conducting wire, and (iii) a receiving circuit including a plurality of multiplexers, which are each configured to select one from among the plurality of conducting wires and to output a signal received through the selected conducting wire. In some embodiments, the receiving circuit is configured to detect an invasive attack on the integrated circuit based on output signals provided by the plurality of multiplexers.

According to another aspect of the inventive concept, there is provided a method that detects an invasive attack using a plurality of conducting wires disposed on an integrated circuit. This method includes generating a random signal and a selection signal based on random or pseudo-random numbers, selecting at least one from among the plurality of conducting wires based on the selection signal, outputting the random signal through the at least one selected conducting wire, and detecting the invasive attack based on signal received through the at least one selected conducting wire.

BRIEF DESCRIPTION OF THE DRAWINGS

Embodiments of the inventive concept will be more clearly understood from the following detailed description taken in conjunction with the accompanying drawings in which.

The drawings attached to the present specification may not fit the scale for convenience of illustration, and may show exaggerated or reduced components.

DETAILED DESCRIPTION OF THE EMBODIMENTS

Figure 1:
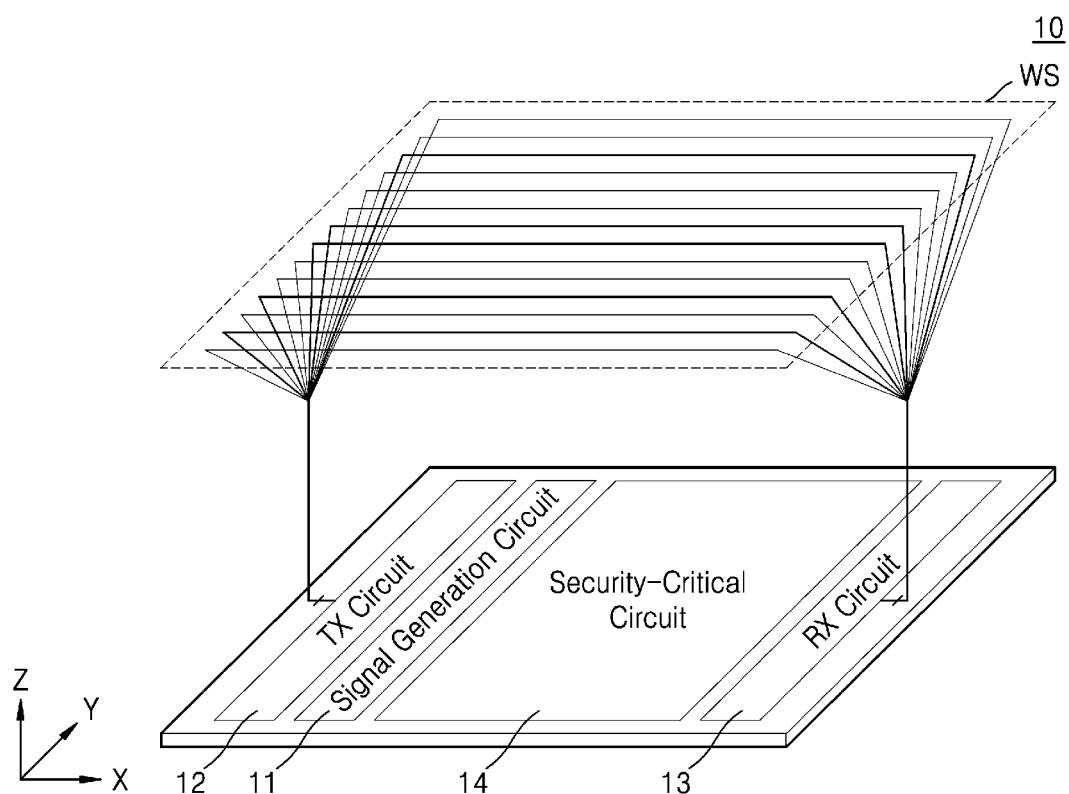
FIG. 1 is a view schematically illustrating an apparatus according to an embodiment of the inventive concept.

FIG. 1 is a view schematically illustrating an apparatus according to an embodiment of the inventive concept. As shown in FIG. 1, an apparatus 10 may include a transmitting circuit 12, a signal generation circuit 11, a security-critical circuit 14, and a receiving circuit 13. Herein, the transmitting circuit 12, the signal generation circuit 11, the security-critical circuit 14, and the receiving circuit 13 may be collectively called an integrated circuit and may be disposed differently than in FIG. 1. Also, the apparatus 10 may include a plurality of conducting wires WS disposed on the integrated circuit, and the plurality of conducting wires WS may be electrically connected to the transmitting circuit 12 and the receiving circuit 13. In some embodiments, the apparatus 10 may be a semiconductor device manufactured by a semiconductor process, and the plurality of conducting wires WS and/or the integrated circuit may be formed by the semiconductor process.

Herein, a Z-axis direction, which is a direction in which the plurality of conducting wires WS faces the integrated circuit, may be referred to as a vertical direction, and components disposed in a +Z-direction relative to other components may be referred to as being over other components, and components disposed in a −Z-direction relative to other components may be referred to as being under other components. Also, a surface exposed in the +Z-direction from among surfaces of a component may be referred to as a top surface of the component, and a surface exposed in the −Z-direction may be referred to as a bottom surface of the component. Each of the Y-axis direction and the X-axis direction may be referred to as a first direction or second direction, and a plane including an X-axis and a Y-axis may be referred to as a horizontal plane. For convenience of illustration, the drawings of the present specification may illustrate only some layers.

The security-critical circuit 14 may store or process information, which may be referred to as security information to be secured from the outside of the apparatus 10. In some embodiments, the security-critical circuit 14 may include a cryptographic circuit and may store a key to be secured or may perform an encryption/decryption operation based on the key. In some embodiments, the security-critical circuit 14 may also store authenticated user's unique information of the apparatus 10, for example, payment information, etc. Attackers may launch an invasive attack on the apparatus 10 so as to extract information from the security-critical circuit 14. For example, the attackers may proceed to dismantling of the apparatus 10 from a top surface of the apparatus 10 in the −Z-direction and may probe the security-critical circuit 14 after powering the apparatus 10, which is dismantled, thereby trying extraction of information. This attack may be referred to an active probing. In some embodiments, when the apparatus 10 has a flip chip structure, dismantling of the apparatus 10 may also include removal of solder balls. In order to protect the security-critical circuit 14 from the active probing, the apparatus 10 may include an active shield as a shield for detecting an invasive attack.

The active shield may include the plurality of conducting wires WS disposed on the security-critical circuit 14 so as to detect dismantling of the apparatus 10 and may detect an abnormality that has occurred in signals passing through the plurality of conducting wires WS, thereby detecting the invasive attack. The plurality of conducting wires WS may extend in various forms. In some embodiments, the plurality of conducting wires WS may extend in parallel in the X-axis direction, as shown in FIG. 1, and in some embodiments, the plurality of conducting wires WS may be a curve according to spaghetti routing.

In the invasive attack, the signals passing through the plurality of conducting wires WS may be estimated, or the conducting wires WS having the same electric potential may be connected to one another by using a jumper so that some of the plurality of conducting wires WS may be removed. Thus, the active shield may be required to prevent the invasive attack by reducing the predictability of the signals passing through the plurality of conducting wires WS while preventing some of the plurality of conducting wires WS from having the same electric potential. Also, the active shield may be required to have high efficiency, for example, high flexibility, low power consumption, and small area, and in particular, when the apparatus 10 is used in a mobile application, the efficiency of the active shield may be significant. Hereinafter, as will be described with reference to the drawings, the active shield according to an embodiment of the inventive concept may provide a structure and function for detecting an advanced invasive attack and simultaneously may provide high efficiency.

The signal generation circuit 11 may generate random signal and selection signal based on random (or pseudo-random) numbers. For example, the signal generation circuit 11 may include at least one random number generator, and values of the random signal and the selection signal may be drawn from the random numbers. The random signal and/or the selection signal may be provided to the transmitting circuit 12 and the receiving circuit 13, and examples of the signal generation circuit 11 will be described below with reference to FIG. 9, etc.

The transmitting circuit 12 may be electrically connected to the plurality of conducting wires WS and may receive the random signal and the selection signal from the signal generation circuit 11. The transmitting circuit 12 may select at least one from among the plurality of conducting wires WS according to the selection signal generated based on the random numbers and may output the random signal through the at least one selected conducting wire. For example, as shown in bold in FIG. 1, some of the plurality of conducting wires WS may be selected by the transmitting circuit 12, and the random signal may be transmitted through the selected conducting wires. As described above, the selection signal may be generated based on the random numbers so that at least one from among the plurality of conducting wires WS may be randomly selected and the random signal generated based on the random numbers may be transmitted through the selected conducting wires. Thus, the predictability of operations of the active shield may be reduced, and two or more conducting wires may be prevented from having the same electric potential, and defenses on the invasive attack may be strengthened. Also, because the random signal are transmitted through some selected conducting wires from among the plurality of conducting wires WS, power consumption due to the active shield may be reduced. Examples of the receiving circuit 12 will be described below with reference to FIG. 3, etc.

The receiving circuit 13 may be electrically connected to the plurality of conducting wires WS and may receive the selection signal from the signal generation circuit 11. Similarly to the transmitting circuit 12, the receiving circuit 13 may select at least one from among the plurality of conducting wires WS according to the selection signal generated based on the random numbers and may receive signal through at least one selected conducting wire. In some embodiments, the transmitting circuit 12 and the receiving circuit 13 may commonly receive the selection signal. Thus, at least one from among the plurality of conducting wires WS may be identically selected. When no invasive attack has occurred, signal received by the receiving circuit 13 through at least one of the plurality of conducting wires WS may be same with the random signal output by the transmitting circuit 12, whereas, when an invasive attack has occurred, the signal may be different from the random signal. Thus, the receiving circuit 13 may detect the invasive attack based on the signal received through at least one conducting wire, and examples of the receiving circuit 13 will be described with reference to FIG. 3, etc. In some embodiments, the transmitting circuit 12, the signal generation circuit 11, the receiving circuit 13, and the plurality of conducting wires WS may be collectively referred to as an active shield.

In some embodiments, conducting wires not selected by the selection signal from among the plurality of conducting wires WS may maintain an electric potential corresponding to the random signal passing through them in a previously selected state. For example, the transmitting circuit 12 and the receiving circuit 13 may float the unselected conducting wires. In some embodiments, the conducting wires not selected by the selection signal from among the plurality of conducting wires WS may have a constant electric potential. For example, the transmitting circuit 12 and/or the receiving circuit 13 may apply a constant electric potential, for example, a ground electric potential, to the unselected conducting wires. Thus, the unselected conducting wires may have different electric potentials from the selected conducting wires. As a result, the predictability of the signals passing through the plurality of conducting wires WS may be reduced.

The security-critical circuit 14 may perform an operation of preventing leakage of security information when the invasive attack has been detected. In some embodiments, the security-critical circuit 14 may stop an operation being performed in response to detection of the invasive attack. In some embodiments, the security-critical circuit 14 may transition at least one pattern or element to an irreversible state in response to detection of the invasive attack, thereby preventing leakage of the security information. For example, the security-critical circuit 14 may apply strong electrical signal to fine patterns, thereby opening the patterns and preventing the signal from being transmitted through the shorted patterns. In some embodiments, the security-critical circuit 14 may perform an operation of rewriting arbitrary data in response to detection of the invasive attack. For example, the security-critical circuit 14 may rewrite arbitrary data (e.g., all-zero data) into memory for storing security information, thereby preventing leakage of the security information. Operations performed by the security-critical circuit 14 in response to detection of the invasive attack are not limited to the above-described examples, and the active shield detects the invasive attack, thereby triggering operations of the security-critical circuit 14 for preventing leakage of the security information.

Figure 2A:
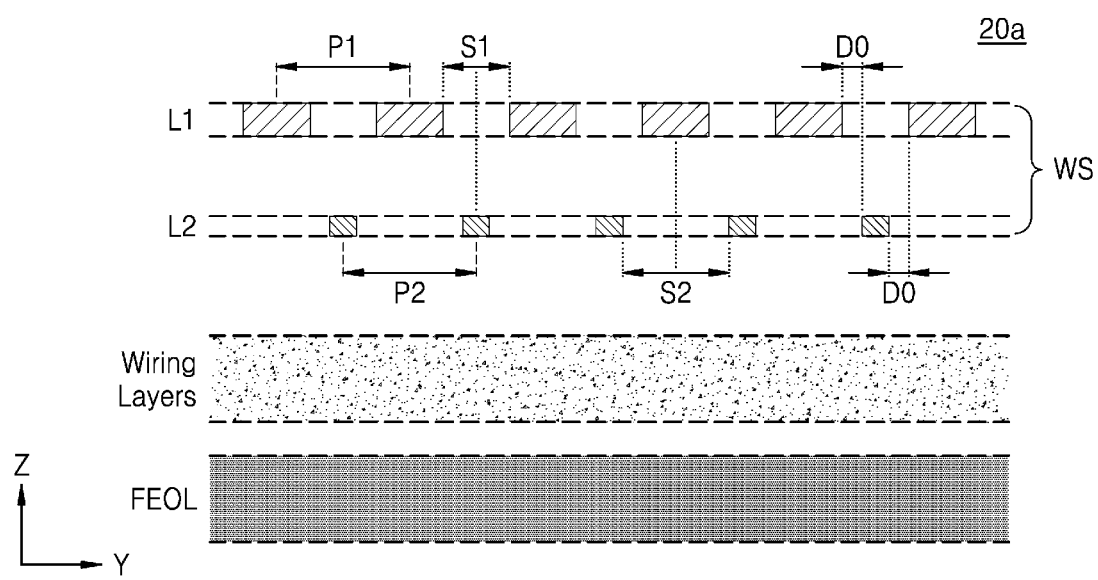
FIGS. 2A and 2B are views illustrating examples of a plurality of conducting wires according to embodiments of the inventive concept.
Figure 2B:
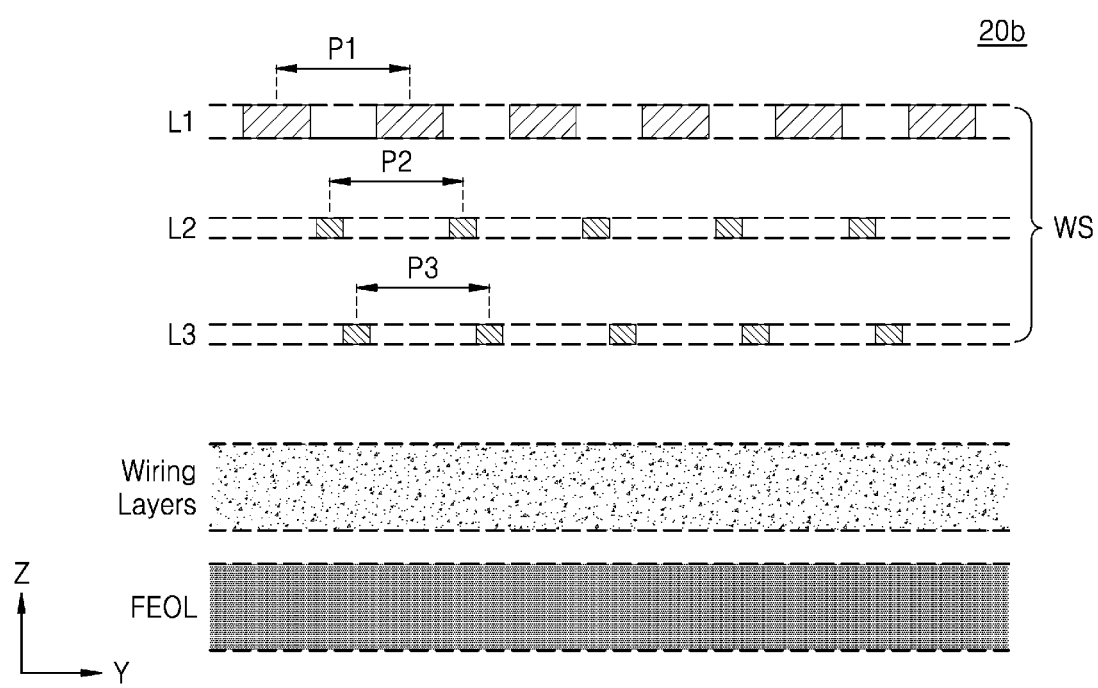

FIGS. 2A and 2B are views illustrating examples of a plurality of conducting wires according to embodiments of the inventive concept. In detail, FIGS. 2A and 2B illustrate examples of a cross-section of a portion of the apparatus 10 of FIG. 1 cut into a plane parallel to a plane including a Y-axis and a Z-axis. Hereinafter, FIGS. 2A and 2B will be described with reference to FIG. 1, and repeated descriptions of FIGS. 2A and 2B will be omitted.

Referring to FIG. 2A, an apparatus 20a may include a plurality of conducting wires WS, and wiring layers and a front-end-of-line (FEOL), which are below the plurality of conductive wires WS. The FEOL may refer to a portion of the semiconductor device 10 in which individual elements, for example, transistors, capacitors, and resistors are formed on a substrate. For example, the FEOL may be formed by operations of planarizing and cleaning a wafer, forming a trench, forming a well, forming a gate line, and forming a source and a drain. The wiring layers may be formed on the FEOL and may include conductive patterns for mutually connecting elements of the FEOL.

The plurality of conducting wires WS may include conducting wires disposed on a plurality of layers. For example, as shown in FIG. 2A, the plurality of conducting wires WS may include a first group of conducting wires disposed on a first layer L1 and a disposed group of conducting wires disposed on a second layer L2. The plurality of conducting wires WS disposed on the first layer L1 and the second layer L2 and patterns disposed on the wiring layers may be collectively referred as a back-end-of-line (BEOL). The BEOL may be formed by operations of siliciding a gate region, a source region, and a drain region, adding a dielectric material, planarization, forming a hole, adding a metallic layer, forming a via, and forming a passivation layer.

In some embodiments, as shown in FIG. 2A, the first group of conducting wires disposed on the first layer L1, which is a topmost layer may have a greater width and spacing than the second group of conducting wires disposed on the second layer L2. For example, as shown in FIG. 2A, the first group of conducting wires may have a first spacing S1, the second group of conducting wires may have a second spacing S2, and the first spacing S1 and the second spacing S2 may be different from each other. In some embodiments, the first group of conducting wires and the second group of conducting wires may have the same pitch. For example, as shown in FIG. 2A, the first group of conducting wires may have a first pitch P1, the second group of conducting wires may have a second pitch P2, and the first pitch P1 and the second pitch P2 may be same. In some embodiments, each of conducting wires of the first group may be disposed in the center of adjacent conducting wires of the second group. Thus, when the plurality of conducting wires WS are seen in the −Z-direction, as shown in FIG. 2A, the first group of conducting wires and the second group of conducting wires may have a uniform distance DO.

Referring to FIG. 2B, an apparatus 20b may include a plurality of conducting wires WS, wiring layers, and an FEOL. The plurality of conducting wires WS may include a first group of conducting wires WS disposed on a first layer L1, a second group of conducting wires WS disposed on a second layer L2, and a third group of conducting wires WS disposed on a third layer L3. In some embodiments, the first group of conducting wires, the second group of conducting wires, and the third group of conducting wires may have a uniform pitch. For example, as shown in FIG. 2B, the first group of conducting wires may have a first pitch P1, the second group of conducting wires may have a second pitch P2, the third group of conducting wires may have a third pitch P3, and the first pitch P1, the second pitch P2, and the third pitch P3 may be same.

Figure 3:
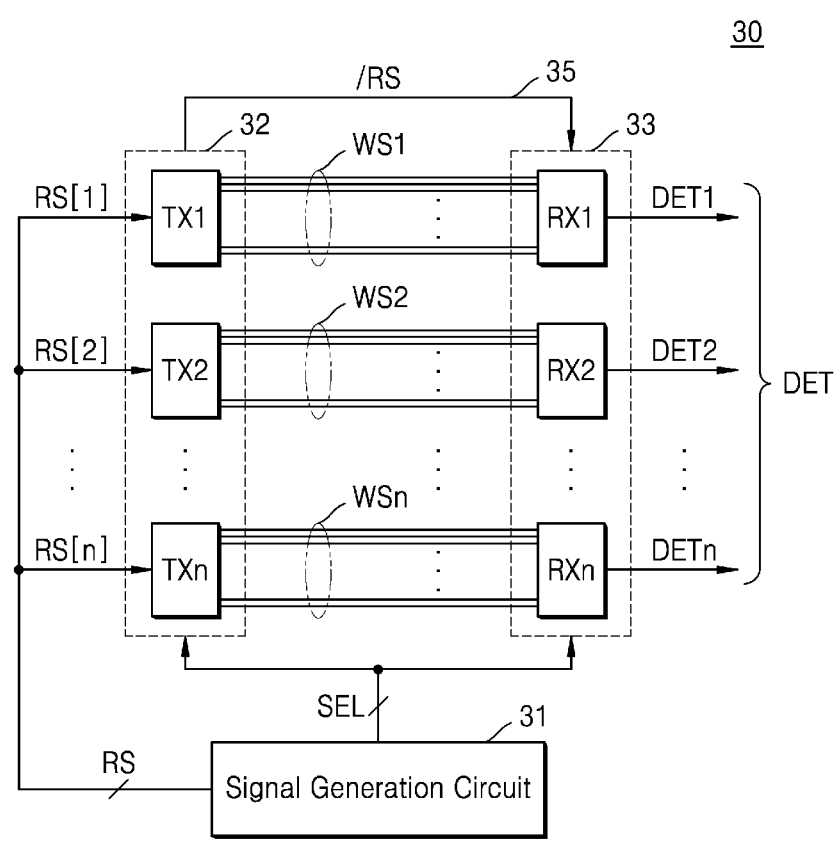
FIG. 3 is a block diagram illustrating an example of an apparatus including an active shield according to an embodiment of the inventive concept.

FIG. 3 is a block diagram illustrating an example of an apparatus including an active shield according to an embodiment of the inventive concept. Similarly to the apparatus 10 of FIG. 1, an apparatus 30 of FIG. 3 may include a signal generation circuit 31, a transmitting circuit 32, and a receiving circuit 33 and may include a plurality of conducting wires WS1, WS2, . . . , and WSn (where n is an integer greater than 1). Also, the apparatus 30 may further include a plurality of conductive patterns 35 connected to the transmitting circuit 32 and the receiving circuit 33.

The signal generation circuit 31 may generate random signal RS and selection signal SEL. For example, the signal generation circuit 31 may generate random numbers and may generate random signal RS and selection signal SEL based on the random numbers, as described above with reference to FIG. 1. As shown in FIG. 3, the random signal RS may be n-bit signal as multi-bit signal and may be provided to the transmitting circuit 32. The selection signal SEL may also be multi-bit signal and may be provided to the transmitting circuit 32 and the receiving circuit 33. In some embodiments, the random signal RS and the selection signal SEL may be transmitted through the conductive patterns disposed under the plurality of conducting wires WS1, WS2, . . . , and WSn (for example, on the wiring layers of FIGS. 2A and 2B).

The transmitting circuit 32 may include first through n-th transmitting unit circuits TX1 through TXn. Each of the first through n-th transmitting unit circuits TX1 through TXn may receive the selection signal SEL and may select at least one conducting wire based on the selection signal SEL. Also, each of the first through n-th transmitting unit circuits TX1 through TXn may output one bit of the random signal RS through at least one selected conducting wire. For example, the first transmitting unit circuit TX1 may select one from among a plurality of first conducting wires WS1 based on the selection signal SEL and may output a first bit RS[1] of the random signal RS through a selected first conducting wire. Also, the second transmitting unit circuit TX2 may select one from among a plurality of second conducting wires WS2 based on the selection signal SEL and may output a second bit RS[2] of the random signal RS through a selected second conducting wire. Also, the n-th transmitting unit circuit TXn may select one from among a plurality of n-th conducting wires WSn based on the selection signal SEL and may output an n-th bit RS[n] of the random signal through an n-th selected conducting wire. In some embodiments, the number of first conducting wires WS1, the number of second conducting wires WS2, and the number of n-th conducting wires WSn may be same.

The receiving circuit 33 may include first through n-th receiving unit circuits RX1 through RXn. Each of the first through n-th receiving unit circuits RX1 through RXn may receive the selection signal SEL and may select at least one conducting wire based on the selection signal SEL. For example, the first receiving unit circuit RX1 may select one from among the plurality of first conducting wires WS1 based on the selection signal SEL, and the second receiving unit circuit RX2 may select one from among the plurality of second conducting wires WS2 based on the selection signal SEL, and the n-th receiving unit circuit RXn may select one from among the plurality of n-th conducting wires WSn based on the selection signal SEL.

In some embodiments, the transmitting circuit 32 may output an inverted random signal/RS through the plurality of conductive patterns 35, and the receiving circuit 33 may receive the inverted random signal/RS through the plurality of conductive patterns 35. Also, the receiving circuit 33 may generate a detection signal DET based on the signal received through the selected conducting wires from among the plurality of conducting wires WS1, WS2, . . . , and WSn and the inverted random signal/RS received through the plurality of conductive patterns 35. For example, the receiving circuit 33 may generate the detection signal DET activated indicating that the invasive attack has occurred, when the signal received through the selected conducting wires from among the plurality of conducting wires WS1, WS2, . . . , and WSn and the inverted random signal/RS are not different from one another bitwise. As shown in FIG. 3, the detection signal DET may include first through n-th detection signals DET1 through DETn, and each of the first through n-th receiving unit circuits RX1 through RXn may generate first through n-th detection signals DET1 through DETn.

In some embodiments, unlike in FIG. 3, the transmitting circuit 32 may output the random signal RS instead of the inverted random signal/RS through the plurality of conductive patterns 35, and the receiving circuit 33 may receive the random signal/RS through the plurality of conductive patterns 35. The receiving circuit 33 may generate the detection signal DET activated indicating that the invasive attack has occurred, when the signal received through the selected conducting wires from among the plurality of conducting wires WS1, WS2, . . . , and WSn and the random signal RS received through the plurality of conductive patterns 35 are not same bitwise. Hereinafter, as shown in FIG. 3, examples, in which the receiving circuit 33 receives the inverted random signal/RS, will be mainly described. However, it will be understood that examples of the inventive concept are not limited thereto.

In some embodiments, the transmitting unit circuit and the receiving unit circuit may have the same length in a direction (e.g., a Y-axis direction of FIG. 1) perpendicular to a direction in which the plurality of conducting wires WS1, WS2, . . . and WSn extend. As will be described below with reference to FIGS. 4A and 4B, because a pair of a transmitting unit circuit and a receiving unit circuit may independently detect the invasive attack, the active shield including pairs of transmitting unit circuits and receiving unit circuits having the same structure may provide high flexibility and high expandability. For example, the pairs of transmitting unit circuits and receiving unit circuits may be easily added to or removed from the active shield according to the size of the apparatus 30 or the size of a security-critical circuit included in the apparatus 30.

Figure 4A:
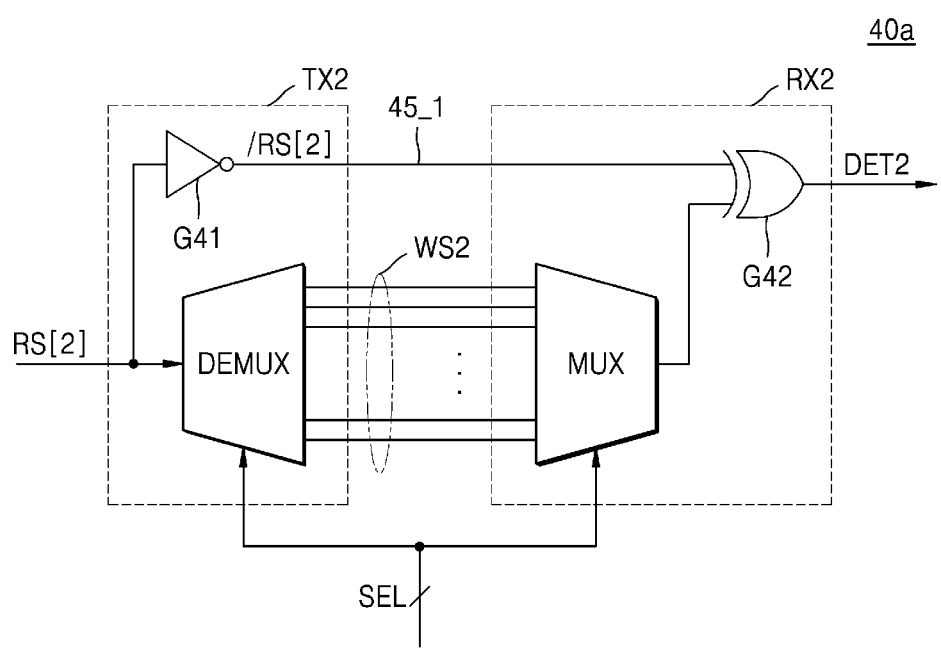
FIGS. 4A and 4B are block diagrams illustrating examples of an apparatus including an active shield according to another embodiment of the inventive concept.
Figure 4B:
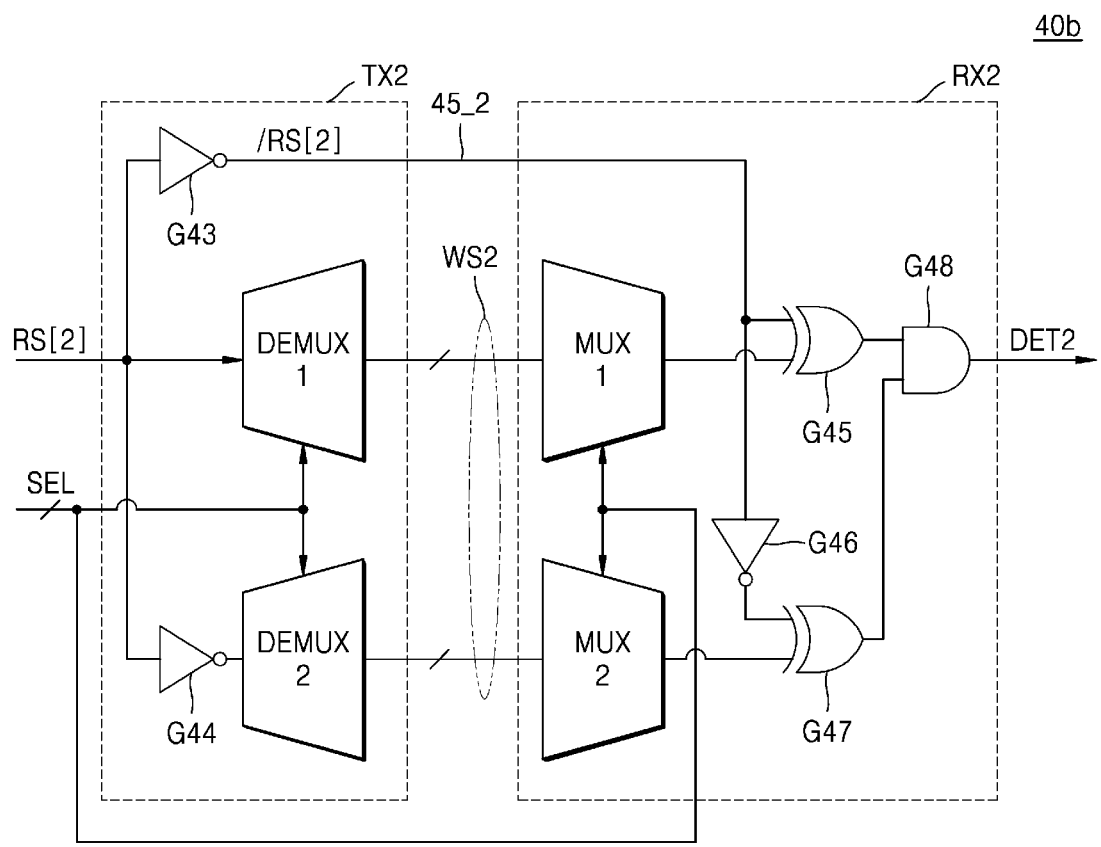

FIGS. 4A and 4B are block diagrams illustrating examples of an apparatus including an active shield according to another embodiment of the inventive concept. In detail, the block diagrams of FIGS. 4A and 4B show examples of a second transmitting unit circuit TX2 and a second receiving unit circuit RX2 that are a pair of a transmitting unit circuit and a receiving unit circuit included in the apparatus 30 of FIG. 3. Hereinafter, among the descriptions of FIGS. 4A and 4B, descriptions of FIGS. 4A and 4B that are the same as those of FIG. 3 will be omitted.

Referring to FIG. 4A, an apparatus 40a may include a second transmitting unit circuit TX2 and a second receiving unit circuit RX2 and may include transmitting unit circuits each having the same structure as the second transmitting unit circuit TX2 and receiving unit circuits each having the same structure as the second receiving unit circuit RX2. The second transmitting unit circuit TX2 may include a demultiplexer DEMUX and an inverter G41. The demultiplexer DEMUX may receive the second bit RS[2] of the random signal RS and the selection signal SEL and may output the second bit RS[2] of the random signal RS through one second conducting wire from among the plurality of second conducting wires WS2 that is selected according to the selection signal SEL. Also, the inverter G41 may invert the second bit RS[2] of the random signal RS so as to generate an inverted second bit/RS[2] of the inverted random signal/RS and to output the inverted second bit/RS[2] through a conductive pattern 45_1. In some embodiments, the plurality of second conducting wires WS2 may be formed on two or more different layers and may be alternately disposed on two different layers (for example, L1 and L2 of FIG. 2A), for example.

The second receiving unit circuit RX2 may include a multiplexer MUX and an XOR gate G42. The multiplexer MUX may receive the selection signal SEL and may provide signal received through one second conducting wire from among the plurality of second conducting wires WS2 that is selected according to the selection signal SEL, to the XOR gate G42. The XOR gate G42 may receive the inverted second bit/RS[2] of the inverted random signal/RS through the conductive pattern 45_1, may receive output signal of the multiplexer MUX, and may generate a second detection signal DET2. Thus, when the inverted second bit/RS[2] of the inverted random signal/RS and the output signal of the multiplexer MUX are different from each other, i.e., when the inverted second bit/RS[2] of the inverted random signal/RS is same with an inverted version of the output signal of the multiplexer MUX, the second detection signal DET2 may have a high level. On the other hand, when the inverted second bit/RS[2] of the inverted random signal/RS and the output signal of the multiplexer MUX are same, i.e., when an event, such as the invasive attack, has occurred in the plurality of second conducting wires WS2, the second detection signal DET2 may have a low level. In some embodiments, unlike in FIG. 4A, the inverter G41 may be omitted from the second transmitting unit circuit TX2, and the second bit RS[2] of the random signal RS may be provided to the second receiving unit circuit RX2 through the conductive pattern 45_1. Also, in some embodiments, unlike in FIG. 4A, the second receiving unit circuit RX2 may also include an XNOR gate instead of the XOR gate G42. For example, when the second receiving unit circuit RX2 receives the second bit RS[2] of the random signal RS instead of the inverted second bit/RS[2] of the inverted random signal/RS, the second receiving unit circuit RX2 may include the XNOR gate instead of the XOR gate G42.

Referring to FIG. 4B, an apparatus 40b may include the second transmitting unit circuit TX2 and the second receiving unit circuit RX2 and may include transmitting unit circuits each having the same structure as the second transmitting unit circuit TX2 and receiving unit circuits each having the same structure as the second receiving unit circuit RX2. In comparison with to the second transmitting unit circuit TX2 of FIG. 4A, the second transmitting unit circuit TX2 may output an inverted bit of the second bit RS[2] of the random signal RS through one second conducting wire from among the plurality of second conducting wires WS2. For example, as is the case in the second transmitting unit circuit TX2 of FIG. 4A, the second transmitting unit circuit TX2 may include a first demultiplexer DEMUX1 and a first inverter G43 and may further include a second inverter G44 for inverting the second bit RS[2] of the random signal RS and a second demultiplexer DEMUX2 for outputting the inverted bit of the second bit RS[2] of the random signal RS through one second conducting wire from among the plurality of second conducting wires WS2. Thus, the plurality of conducting wires WS including the plurality of second conducting wires WS2 may include pairs of conducting wires through which inverted signals pass, and the occurrence of conducting wires having the same electric potential from among the plurality of conducting wires WS may be further reduced. In some embodiments, the first inverter G43 may be omitted, and output signal of the second inverter G44 may be output through a conductive pattern 45_2.

In comparison with to the second receiving unit circuit RX2 of FIG. 4A, the second receiving unit circuit RX2 may receive the inverted bit of the second bit RS[2] of the random signal RS through one second conducting wire from among the plurality of second conducting wires WS2. For example, similarly in the second receiving unit circuit RX2 of FIG. 4A, the second receiving unit circuit RX2 may include the first multiplexer MUX1 and a first XOR gate G45 and may further include a second multiplexer MUX that receives the inverted bit of the second bit RS[2] of the random signal RS through one second conducting wire from among the plurality of second conducting wires WS2. Also, the second receiving unit circuit RX2 may further include a third inverter G46 for inverting the inverted second bit/RS [2] of the inverted random signal/RS received through the conductive pattern 45_2, a second XOR gate G47, and an AND gate G48, and the second detection signal DET2 may correspond to output signal of the AND gate G48. In some embodiments, as described above with reference to FIG. 4B, the plurality of second conducting wires WS2 may be alternately disposed on two different layers (for example, L1 and L2 of FIG. 2A).

Figure 5:
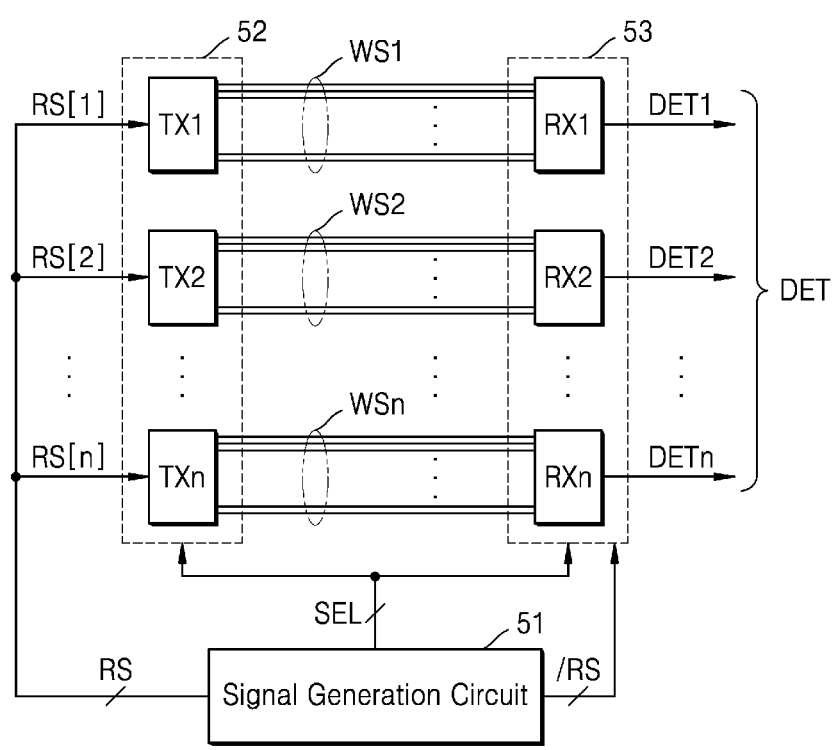
FIG. 5 is a block diagram illustrating an example of an apparatus including an active shield according to an embodiment of the inventive concept.

FIG. 5 is a block diagram illustrating an example of an apparatus including an active shield according to an embodiment of the inventive concept. Similarly in the apparatus 30 of FIG. 3, an apparatus 50 of FIG. 5 may include a signal generation circuit 51, a transmitting circuit 52, and a receiving circuit 53 and may include a plurality of conducting wires WS1, WS2, . . . , and WSn. In comparison with to the apparatus 30 of FIG. 3, the receiving circuit 53 of FIG. 5 may receive inverted random signal/RS from the signal generation unit 51. Hereinafter, repeated descriptions of FIG. 3 among the descriptions of FIG. 5 will be omitted.

The signal generation circuit 51 may generate random signal RS and selection signal SEL and may further generate inverted random signal/RS. As shown in FIG. 5, the signal generation circuit 51 may provide the random signal RS and the selection signal SEL to the transmitting circuit 52 and may provide the inverted random signal/RS and the selection signal SEL to the receiving circuit 53. In some embodiments, the random signal RS, the inverted random signal/RS, and the selection signal SEL may be transmitted through conductive patterns disposed under the plurality of conducting wires WS1, WS2, . . . , and WSn (for example, on the wiring layers of FIGS. 2A and 2B).

In some embodiments, as will be described below with reference to FIG. 9, the signal generation circuit 51 may include a true random number generator, a first pseudo random number generator, and at least one second pseudo random number generator which generates a first random number RN1, a second random number RN2, and a third random number RN3 respectively, and the random signal RS and the selection signal SEL may be generated from the third random number RN3. In this case, the signal generation circuit 51 may include two second pseudo random number generators that commonly receive the second random number RN2 and have the same structure. The two second pseudo random number generators may be disposed adjacent to each of the transmitting circuit 52 and the receiving circuit 53, and each of the two second pseudo random number generators may generate the same third random numbers. The signal generation circuit 51 may invert the third random numbers generated by the second pseudo random number generators disposed adjacent to the receiving circuit 53, thereby providing the inverted random signal/RS to the receiving circuit 53. In some embodiments, unlike in FIG. 5, the signal generation circuit 51 may provide the random signal RS instead of the inverted random signal/RS, to the receiving circuit 53. For example, the signal generation circuit 51 may provide the third random numbers as the random signal RS, which are generated by the second pseudo random number generators disposed adjacent to the receiving circuit 53, to the receiving circuit 53.

The transmitting circuit 52 may include first through n-th transmitting unit circuits TX1 through TXn. The transmitting circuit 52 may receive the random signal RS and the selection signal SEL from the signal generation circuit 51 and may output the random signal RS through conducting wires from among the plurality of conducting wires WS1, WS2, . . . , and WSn according to the selection signal SEL. The receiving circuit 53 may receive the inverted random signal RS and the selection signal SEL from the signal generation circuit 51 and may generate detection signal DET including first through n-th detection signals DET1 through DETn based on signal received through conducting wires selected from among the plurality of conducting wires WS1, WS2, . . . and WSn according to the selection signal SEL and the inverted random signal RS.

Figure 6:
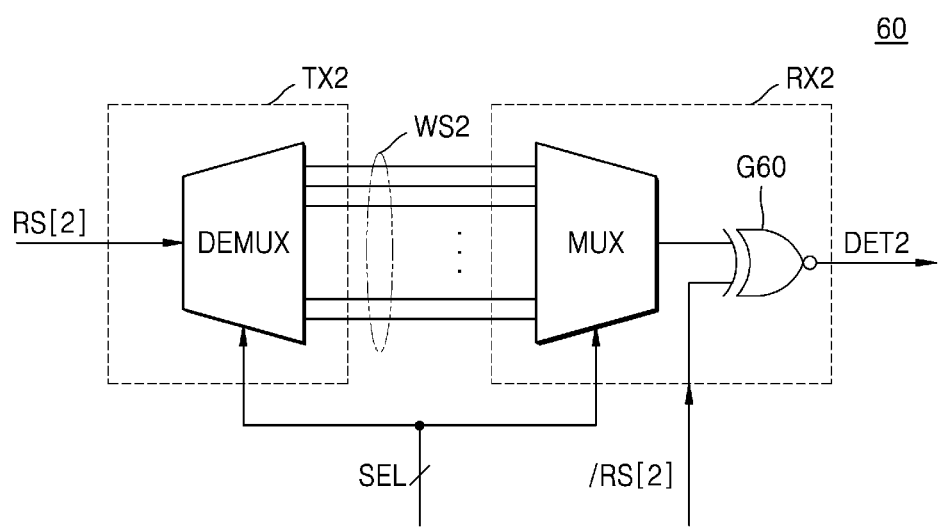
FIG. 6 is a block diagram illustrating an example of an apparatus including an active shield according to another embodiment of the inventive concept.

FIG. 6 is a block diagram illustrating an example of an apparatus including an active shield according to another embodiment of the inventive concept. In detail, the block diagram of FIG. 6 shows an example of a second transmitting unit circuit TX2 and a second receiving unit circuit RX2 that are a pair of a transmitting unit circuit and a receiving unit circuit included in the apparatus 50 of FIG. 5. As shown in FIG. 6, an apparatus 60 may include the second transmitting unit circuit TX2 and the second receiving unit circuit RX2 and may include transmitting unit circuits each having the same structure as the second transmitting unit circuit TX2 and receiving unit circuits each having the same structure as the second receiving unit circuit RX2. Hereinafter, repeated descriptions of FIG. 5 among the descriptions of FIG. 6 will be omitted.

The second transmitting unit circuit TX2 may include a demultiplexer DEMUX. The demultiplexer DEMUX may receive a second bit RS[2] of random signal RS and selection signal SEL and may output the second bit RS[2] of the random signal RS through a second conducting wire from among a plurality of second conducting wires WS2, selected according to the selection signal SEL. In comparison with to the second transmitting unit circuit TX2 of FIG. 4A, an inverter may be omitted from the second transmitting unit circuit TX2 of FIG. 6, and output of an inverted second bit/RS[2] of inverted random signal/RS may be omitted.

The second receiving unit circuit RX2 may include a multiplexer MUX and an XNOR gate G60. The multiplexer MUX may receive the selection signal SEL and may provide signal received through one from among the plurality of second conducting wires WS2 that is selected according to the selection signal SEL, to the XNOR gate G60. The XNOR gate G60 may receive the inverted second bit/RS[2] of the inverted random signal/RS from a signal generation circuit (for example, 51 of FIG. 5), may receive output signal of the multiplexer MUX, and may generate a second detection signal DET2. Thus, when the inverted second bit/RS[2] of the inverted random signal/RS and the output signal of the multiplexer MUX are different from each other, i.e., when the inverted second bit/RS[2] of the inverted random signal/RS is same with an inverted version of the output signal of the multiplexer MUX, the second detection signal DET2 may have a low level. On the other hand, when the inverted second bit/RS[2] of the inverted random signal/RS and the output signal of the multiplexer MUX are same, i.e., when an event such as an invasive attack has occurred in the plurality of second conducting wires WS2, the second detection signal DET2 may have a high level. In some embodiments, unlike in FIG. 4A, and in some embodiments, unlike in FIG. 6, the second receiving unit circuit RX2 may include an XOR gate instead of the XNOR gate G60.

Figure 7:
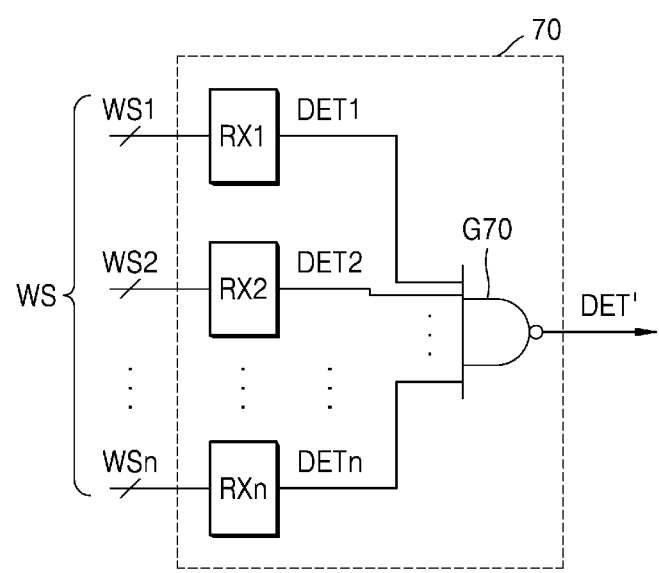
FIG. 7 is a block diagram illustrating an example of a receiver circuit according to an embodiment of the inventive concept.

FIG. 7 is a block diagram of an example of a receiving circuit according to an embodiment of the inventive concept. As shown in FIG. 7, a receiving circuit 70 may include first through n-th receiving unit circuits RX1 through RXn and may further include a NAND gate G70. Hereinafter, in the description of FIG. 7, it is assumed that each of the first through n-th receiving unit circuits RX1 through RXn of FIG. 7 may have the same structure as the second receiving unit circuit RX2 of FIG. 4A.

A receiving circuit 70 may be connected to a plurality of conducting wires WS. For example, as shown in FIG. 7, the first receiving unit circuit RX1 may be connected to a plurality of first conducting wires WS1, and the second receiving unit circuit RX may be connected to a plurality of second conducting wires WS2, and an n-th receiving unit circuit RXn may be connected to a plurality of n-th conducting wires WSn. As described above with reference to FIG. 4A, each of the first through n-th receiving unit circuits RX1 through RXn may generate detection signal having a low level when an abnormality has occurred in signal passing through conducting wires connected to the first through n-th receiving unit circuits RX1 through RXn. For example, the first receiving unit circuit RX1 may generate a first detection signal DET1 having a low level when an abnormality has occurred in signal passing through the plurality of first conducting wires WS1.

The NAND gate G70 may receive the first through n-th detection signals DET1 through DETn and may generate detection signal DET', as shown in FIG. 7. Thus, the detection signal DET' may have a high level when an abnormality has occurred in signal passing through selected conducting wires from among the plurality of conducting wires WS. In some embodiments, the security-critical circuit 14 of FIG. 1 may recognize the occurrence of the invasive attack based on the detection signal DET' of FIG. 7. In some embodiments, unlike in FIG. 7, the NAND gate G70 that receives the first through n-th detection signals DET1 through DETn may be included outside the receiving circuit 70, for example, the security-critical circuit 14 of FIG. 1. Also, in some embodiments, when each of the first through n-th receiving unit circuits RX1 through RXn has the same structure as the second receiving unit circuit RX2 of FIG. 6, the receiving circuit 70 may include an OR gate that generates the detection signal DET' instead of the NAND gate G70.

Figure 8A:
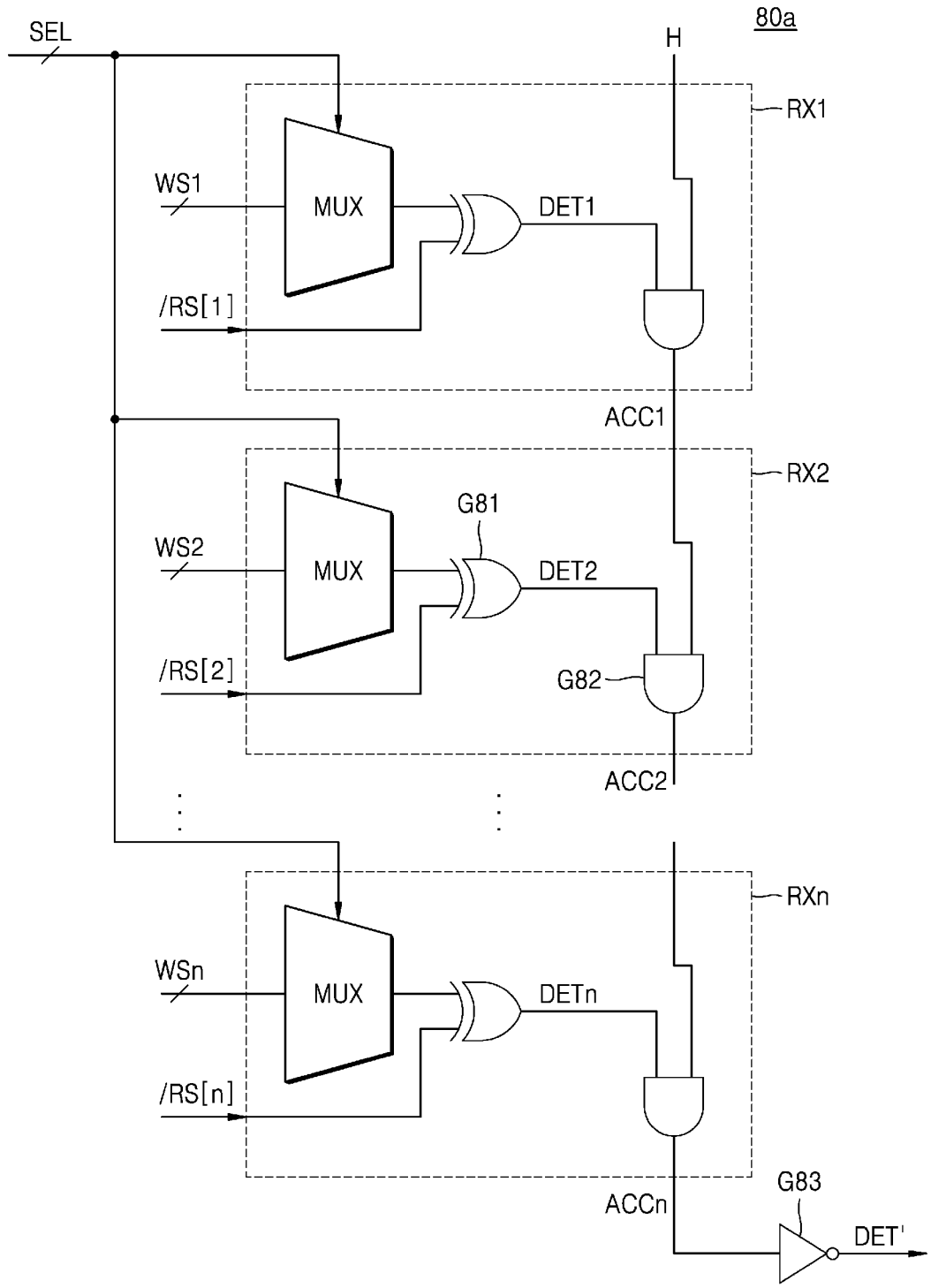
FIGS. 8A and 8B are block diagrams illustrating examples of a receiver circuit according to another embodiment of the inventive concept.
Figure 8B:
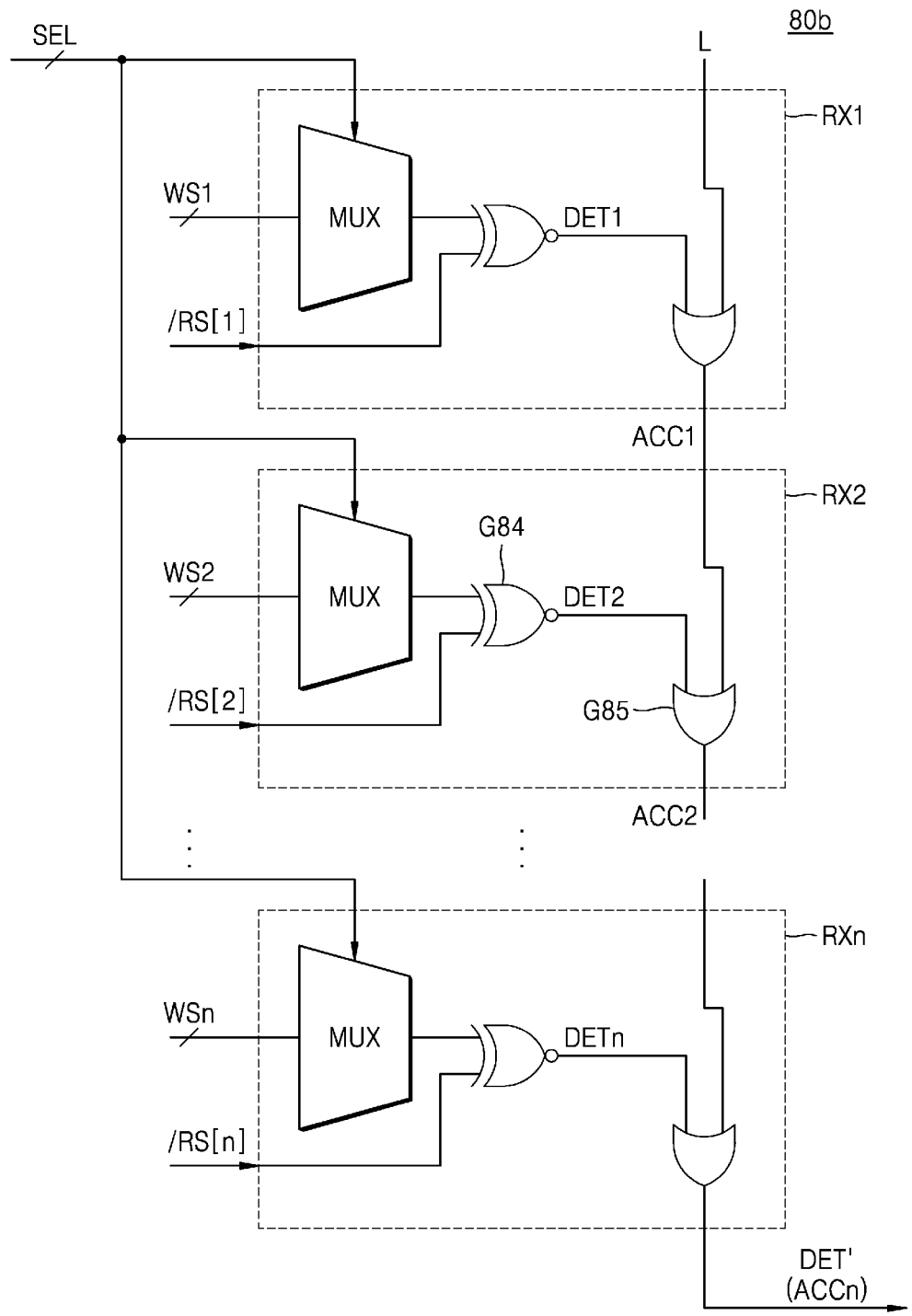

FIGS. 8A and 8B are block diagrams of examples of a receiving circuit according to another embodiment of the inventive concept. In comparison with to the receiving circuit 70 of FIG. 7, the receiving circuits 80a and 80b of FIGS. 8A and 8B may generate detection signal DET' as an accumulated detection signal sequentially generated by the first through n-th receiving unit circuits RX1 through RXn. As will be described below, the accumulated detection signal may be propagated by the first through n-th receiving unit circuits RX1 through RXn of FIGS. 8A and 8B. Thus, when the first through n-th receiving unit circuits RX1 through RXn of FIGS. 8A and 8B are compared to the receiving circuit 70 of FIG. 7, patterns for routing of the first through n-th detection signals DET1 through DETn may be reduced. Hereinafter, repeated descriptions of FIGS. 8A and 8B will be omitted.

Referring to FIG. 8A, a receiving circuit 80a may include first through n-th receiving unit circuits RX1 through RXn and an inverter G83. Each of the first through n-th receiving unit circuits RX1 through RXn may generate an accumulated detection signal. For example, the second receiving unit circuit RX2 may include a multiplexer MUX, an XOR gate G81, and an AND gate G82. The multiplexer MUX may be connected to the plurality of second conducting wires WS2 and may receive the selection signal SEL. The XOR gate G81 may receive output signal of the multiplexer MUX and an inverted second bit/RS[2] of inverted random signal/RS and may generate a second detection signal DET2. Thus, the second detection signal DET2 may have a low level when an abnormality has occurred in signal passing through the plurality of second conducting wires WS2, as described above with reference to FIG. 4A. The AND gate G82 may receive the second detection signal DET2 and a first accumulated detection signal ACC1 provided from the first receiving unit circuit RX1 and may generate a second accumulated detection signal ACC2. As shown in FIG. 8A, because, in the first receiving unit circuit RX1, the first accumulated detection signal ACC1 is generated by the AND gate that receives the first detection signal DET1 and a signal H having a high level, the second accumulated detection signal ACC2 having a low level may indicate that an abnormality has occurred in signal passing through the plurality of first conducting wires WS1 and/or signal passing through the plurality of second conducting wires WS2. Similarly, the n-th receiving unit circuit RXn may generate an n-th accumulated detection signal ACCn, and the n-th accumulated detection signal ACCn having a low level may indicate that an abnormality has occurred in signal passing through the plurality of conducting wires WS1, WS2, . . . , and WSn. The inverter G83 may invert the n-th accumulated detection signal ACCn, thereby generating detection signal DET'. Thus, the detection signal DET' having a high level may indicate that an abnormality has occurred in signal passing through the plurality of conducting wires WS1, WS2, . . . , and WSn. In some embodiments, it will be understood that, even when the first through n-th detection signals DET1 through DETn are generated, as described above with reference to FIG. 4B, the detection signal DET' may be generated, similarly to that shown in FIG. 8A.

Referring to FIG. 8B, the receiving circuit 80b may include first through n-th receiving unit circuits RX1 through RXn. Each of the first through n-th receiving unit circuits RX1 through RXn may generate an accumulated detection signal. For example, the second receiving unit circuit RX2 may include a multiplexer MUX, an XNOR gate G84, and an OR gate G85. The multiplexer MUX may be connected to the plurality of second conducting wires WS2 and may receive the selection signal SEL. The XNOR gate G84 may receive output signal of the multiplexer MUX and the inverted second bit/RS[2] of the inverted random signal/RS and may generate a second detection signal DET2. Thus, the second detection signal DET2 may have a high level when an abnormality has occurred in signal passing through the plurality of second conducting wires WS2, as described above with reference to FIG. 6. The OR gate G85 may receive the second detection signal DET2 and the first accumulated detection signal ACC1 provided from the first receiving unit circuit RX1 and may generate a second accumulated detection signal ACC2.

As shown in FIG. 8B, because, in the first receiving unit circuit RX1, the first accumulated detection signal ACC1 is generated by the OR gate that receives the first detection signal DET1 and a signal L having a low level, the second accumulated detection signal ACC2 having a high level may indicate that an abnormality has occurred in signal passing through the plurality of first conducting wires WS1 and signal passing through the plurality of second conducting wires WS2. Likewise, the n-th receiving unit circuit RXn may generate an n-th accumulated detection signal ACCn, and the n-th accumulated detection signal ACCn having a high level may indicate that an abnormality has occurred in signal passing through the plurality of conducting wires WS1, WS2, . . . , and WSn, and the n-th accumulated detection signal ACCn may be output as the detection signal DET'.

Figure 9:
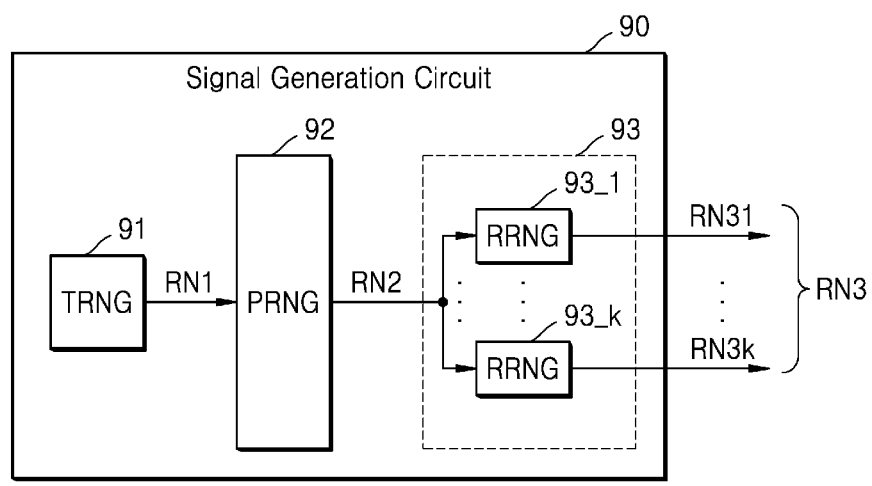
FIG. 9 is a block diagram illustrating an example of a signal generation circuit according to an embodiment of the inventive concept.

FIG. 9 is a block diagram illustrating an example of a signal generation circuit according to an embodiment of the inventive concept. In some embodiments, the signal generation circuit 90 may generate random signal RS as part of a random number, i.e., a third random number RN3, and may generate selection signal SEL as the other part of the third random number RN3. As shown in FIG. 9, the signal generation circuit 90 may include a true random number generator TRNG 91, a first pseudo random number generator PPNG 92, and at least one second pseudo random number generator 93. Herein, the true random number generator TRNG 91 and the first pseudo random number generator PPNG 92 may be referred to as a first random number generator and a second random number generator, respectively, and at least one second pseudo random number generator 93 may be referred to as at least one third random number generator.

The true random number generator 91 may generate a first random number RN1 that is unpredictable. The true random number generator 91 may have an arbitrary structure for generating the first random number RN1 that is unpredictable. In some embodiments, the true random number generator 91 may periodically generate the first random number RN1, and in some embodiments, the true first random number generator 91 may generate the first random number RN1 in response to a request of the first pseudo random number generator 92. The true random number generator 91 may consume relatively high power so as to generate the first random number RN1 and may be required to generate a new first random number RN1 with a relatively long time, i.e., to update the first random number RN1. Thus, when the random signal RS and/or the selection signal SEL is generated as part of the first random number RN1 generated by the true random number generator 91, it may not be easy to protect a security-critical circuit, such as the receiver circuit 13 of FIG. 1, from an advanced invasive attack. Thus, the signal generation circuit 90 may further include at least one pseudo random number generator, for example, 92 that uses the first random number RN1 as a seed.

The first pseudo random number generator 92 may generate a second random number RN2 based on the first random number RN1. In some embodiments, the first pseudo random number generator 92 may generate a second random number RN2 according to a sequence having characteristics approximated to characteristics of random numbers and may have an arbitrary structure in which a starting point of the sequence varies according to the first random number RN1. For example, the first pseudo random number generator 92 may include a self-looped substitution-permutation network (SPN), and the first random number RN1 may be provided with an initial input of the SPN. Thus, the first pseudo random number generator 92 may generate the second random number RN2 at an adjustable period, i.e., update the second random number RN2. In some embodiments, the first pseudo random number generator 92 may be set to update the second random number RN2 at a fixed period unlike in at least one second pseudo random number generator 93 that will be described below. Also, in some embodiments, as will be described below with reference to FIG. 11, the first pseudo random number generator 92 may update the second random number RN2 at a period adjusted according to signal received from the outside of the signal generation circuit 90.

At least one second pseudo random number generator 93 may generate a third random number RN3 based on the second random number RN2. For example, a second pseudo random number generator 93_l may generate a third random number RN31 based on the second random number RN2, and a second pseudo random number generator 93_k may generate a third random number RN3k based on the third random number RN31. In some embodiments, the third random numbers RN3k and RN31 generated by two or more second pseudo random number generators 93_l and 93_k may be used for different active shields and may have different bit widths, as will be described below with reference to FIG. 10. Also, in some embodiments, the second pseudo random number generator 93_l and the second pseudo random number generator 93_k may receive at least different parts of the second random number RN2. In some embodiments, the at least one second pseudo random number generator 93 may generate a third random number RN3 by using at least part of the second random number RN2 as a seed and may adjust a update period of the third random number RN3 based on at least part of the second number RN2.

Unlike in FIG. 9, at least one second pseudo random number generator 93 may be omitted, and the random signal RS and the selection signal SEL may be generated from the second random number RN2. Also, in some embodiments, unlike in FIG. 9, the signal generation circuit 90 may further include an additional pseudo random number generator that receives the third random number RN3, and the random signal RS and the selection signal SEL may be generated from random numbers generated by the additional pseudo random generator.

Figure 10:
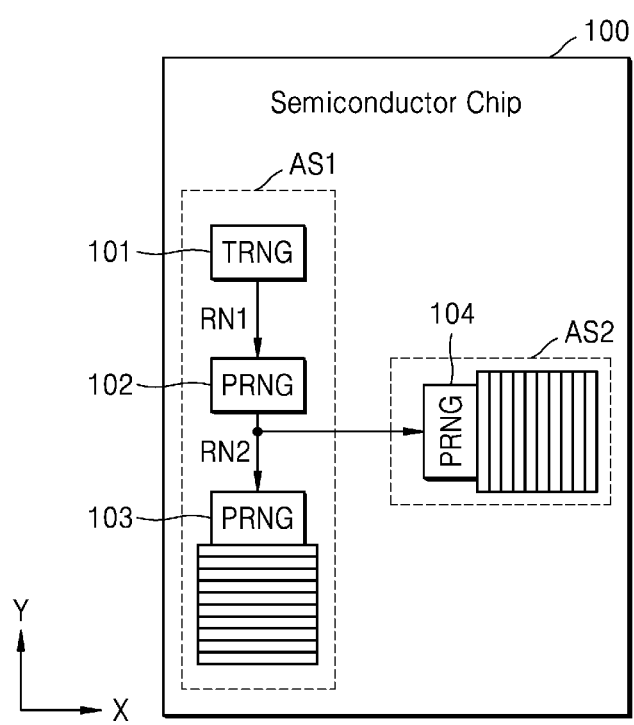
FIG. 10 is a block diagram illustrating an example of an apparatus including an active shield according to an embodiment of the inventive concept.

FIG. 10 is a block diagram illustrating an example of an apparatus including an active shield according to an embodiment of the inventive concept. In detail, FIG. 10 illustrates a semiconductor chip 100 including a first active shield AS1 and a second active shield AS2. In some embodiments, the active shield may be disposed only in a region of the semiconductor chip 100 in which a security-critical circuit is located.

Referring to FIG. 10, the first active shield AS1 may include a true random number generator 101, a first pseudo random number generator 102, and a second pseudo random number generator 103. The true random number generator 101 may provide a first random number RN1 to a first pseudo random number generator 102, and the first pseudo random number generator 102 may generate a second random number RN2 based on the first random number RN1. The first random number generator 101 may provide the second random number RN2 to a second pseudo random number generator 103 and a second pseudo random number generator 104 included in a second active shield AS2. The second pseudo random number generator 103 may generate a third random number as random signal and selection signal used in the first active shield AS1, whereas the second pseudo random number generator 104 may generates a third random number as random signal and selection signal used in the second active shield AS2. As a result, the first active shield AS1 and the second active shield AS2 may share the true random number generator 101 and the first pseudo random number generator 102.

Figure 11:
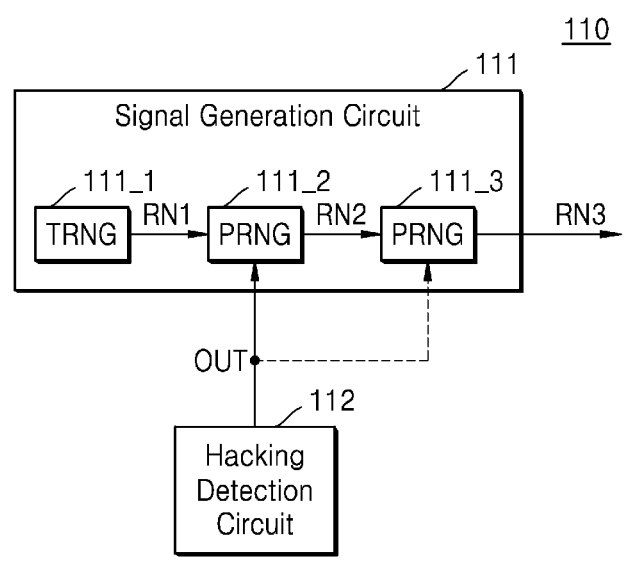
FIG. 11 is a block diagram illustrating an example of an apparatus including an active shield according to another embodiment of the inventive concept.

FIG. 11 is a block diagram illustrating an example of an apparatus including an active shield according to another embodiment of the inventive concept. In detail, the block diagram of FIG. 11 illustrates an apparatus 110 further including another structure for detecting attacks on the apparatus 110, i.e., a hacking detection circuit 112, in addition to an active shield. As shown in FIG. 11, the apparatus 110 may include a signal generation circuit 111 and the hacking detection circuit 112.

The signal generation circuit 111 may include a true random number generator 111_1, a first pseudo random number generator 111_2, and at least one second pseudo random number generator 111_3, and a first random number RN1, a second random number RN2, and a third random number RN3 may be generated. As described above with reference to FIG. 9, pseudo random number generators, i.e., a first pseudo random number generator 111_2 and at least one second pseudo random number generator 1113 may generate the second random number RN2 and the third random number RN3 at an adjustable period.

The hacking detection circuit 112 may be referred to as an attack countermeasure and may detect attacks on the apparatus 110 in an arbitrary manner, thereby generating an output signal OUT. For example, the hacking detection circuit 112 may include another active shield independent of the signal generation circuit 111 and may also include a light detection sensor (for example, a photodiode) for sensing light flowing into the apparatus 110 when dismantling.

The active shield including the signal generation circuit 111 may enhance detection of an invasive attack when attacks are detected by the hacking detection circuit 112. In some embodiments, the signal generation circuit 111 may increase the update speed of the random numbers when no attacks are detected by the hacking detection circuit 112. For example, as shown in FIG. 11, the first pseudo random number generator 1112 may receive the output signal OUT from the hacking detection circuit 112, and when the output signal OUT indicates detection of attacks, the first pseudo random number generator 111_2 may shorten an update period of the second random number RN2. Also, as indicated by dotted lines in FIG. 11, at least one second pseudo random number generator 111_3 may also receive the output signal OUT from the hacking detection circuit 112, and when the output signal OUT indicates detection of attacks, the at least one second pseudo random number generator 111_3 may shorten an update period of the third random number RN3. Thus, when attacks are detected in another region of the apparatus 110 or in another manner, the active shield including the signal generation circuit 111 may enhance detection of an invasive attack and become more sensitive to the invasive attack.

Figure 12:
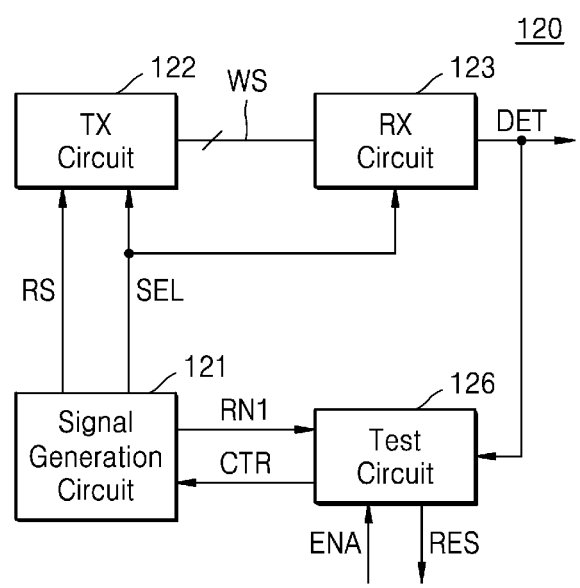
FIG. 12 is a block diagram illustrating an example of an apparatus including an active shield according to another embodiment of the inventive concept.

FIG. 12 is a block diagram illustrating an example of an apparatus including an active shield according to another embodiment of the inventive concept. As shown in FIG. 12, an apparatus 120 may include a signal generation circuit 121, a transmitting circuit 122, a receiving circuit 123, and a plurality of conducting wires WS and may further include a test circuit 126. Repeated descriptions of FIG. 12 among the above descriptions with reference to the drawings will be omitted.

The signal generation circuit 121 may generate random signal RS and selection signal SEL based on random numbers. For example, as described above with reference to FIG. 9, the signal generation circuit 121 may include a true random number generator that generates a first random number RN1. As shown in FIG. 12, the signal generation circuit 121 may provide random signal RS to the transmitting circuit 122 and may provide selection signal SEL to the transmitting circuit 122 and the receiving circuit 123. Also, the signal generation circuit 121 may provide the first random number RN1 generated by the true random number generator to the test circuit 126. The transmitting circuit 122 and the receiving circuit 123 may be connected to each other through a plurality of conducting wires WS, and the receiving circuit 123 may generate detection signal DET indicating whether an abnormality has occurred in signals passing through the plurality of conducting wires WS. As shown in FIG. 12, the detection signal DET may also be provided to the test circuit 126.

The test circuit 126 may perform testing on an active shield. For example, as shown in FIG. 12, the test circuit 126 may initiate testing in response to an enable signal ENA that is activated, and may generate a result signal RES indicating the result of testing the active shield. In some embodiments, the enable signal ENA may be omitted, and the test circuit 126 may initiate testing of the active shield upon the apparatus 120 is powered. When the result signal RES indicates that the active shield has passed the test and the detection signal DET indicates that no invasive attack has occurred, the active shield may initiate an operation of detecting the invasive attack. Also, in some embodiments, the enable signal ENA may also be periodically activated. As shown in FIG. 12, the test circuit 126 may receive a first random number RN1 for testing the active shield and may provide a control signal CTR to the signal generation circuit 121. An example of a method of testing an active shield by using the test circuit 126 will be described below with reference to FIG. 13.

Figure 13:
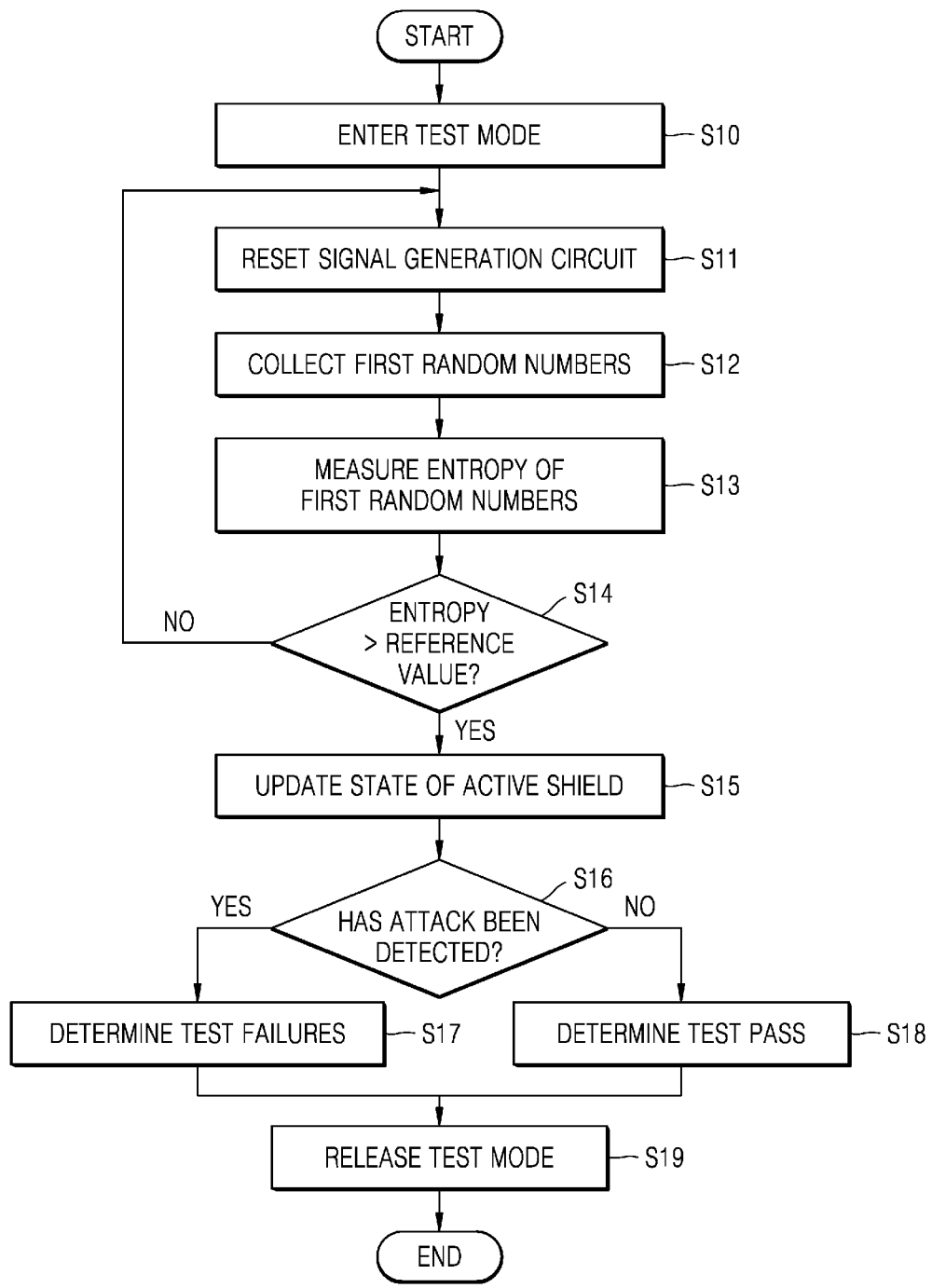
FIG. 13 is a flowchart illustrating an example of a method of testing an active shield according to an embodiment of the inventive concept.

FIG. 13 is a flowchart illustrating an example of a method of testing an active shield according to an embodiment of the inventive concept. In some embodiments, the testing method of FIG. 13 may be performed by the test circuit 126 of FIG. 12. As shown in FIG. 13, the method of testing the active shield may include a plurality of operations S10 through S19, and hereinafter, FIG. 13 will be described with reference to FIG. 12.

In Operation S10, an operation for entering a test mode may be performed. For example, the test circuit 126 may enter the test mode in response to an enable signal ENA that is activated. In some embodiments, the enable signal ENA may be activated when powering of the apparatus 120 is initiated, and/or the enable signal ENA may be periodically activated while the apparatus 120 is powered. Also, in some embodiments, the enable signal ENA may be omitted, and the test circuit 126 may also enter the test mode when powering of the apparatus 120 is initiated. In some embodiments, the test circuit 126 may generate, for example, a result signal RES that is not activated, indicating that the active shield has not passed the test during the test mode.

In Operation S11, an operation of resetting the signal generation circuit 121 may be performed. For example, the test circuit 126 may rest the signal generation circuit 121 according to the control signal CTR. Random number generators included in the signal generation circuit 121, for example, a true random number generator and a pseudo random number generator may be rest in response to the control signal CTR. Thus, the true random number generator may generate a first random number RN1 in a different state from the state before the reset.

In Operation S12, an operation of collecting first random numbers may be performed, and in Operation S13, an operation of measuring entropy of the first random numbers may be performed. As described above with reference to FIG. 12, the first random number RN1 may be generated by the true random number generator included in the signal generation circuit 121, and the test circuit 126 may collect first random numbers provided from the signal generation circuit 121, thereby measuring entropy of the first random numbers. For example, the test circuit 126 may calculate a hamming weight of the first random number RN1 and may measure entropy of the first random numbers, which is the entropy of the true random number generator included in the signal generation circuit 121 based on a distribution of hamming weights.

In Operation S14, an operation of comparing measured entropy to a reference value may be performed. As shown in FIG. 13, when entropy of the first random numbers is larger than the reference value, Operation S15 may be subsequently performed, whereas, when entropy of the first random numbers is less than the reference value, in Operation S11, an operation of resetting the signal generation circuit 121 may be performed again. Entropy of a pseudo random number generator may depend on entropy of a seed. Thus, entropy of first random numbers used as a seed of the pseudo random number generator is verified so that the predictability of signal passing through the plurality of conducting wires WS may be reduced.

In Operation S15, an operation of updating the state of the active shield may be performed. For example, the signal generation circuit 121 of FIG. 12 may include a true random number generator, a first pseudo random number generator, and at least one second pseudo random number generator, as described above with reference to FIG. 9, and the test circuit 126 may update the at least one second pseudo random number generator, i.e., the third random number RN3 after updating the first pseudo random number generator, i.e., the second random number RN2 through the control signal CTR. Thus, the random signal RS and the selection signal SEL generated from the third random number RN3 may be updated, and detection signal DET corresponding to the updated random signal RS and selection signal SEL may be generated.

In Operation S16, an operation of determining whether an attack has been detected, may be performed. For example, the test circuit 126 may determine whether an attack has been detected, based on the detection signal DET provided from the receiving circuit 123. As shown in FIG. 13, when an attack has been detected, i.e., when an abnormality has occurred in signal passing through the plurality of conducting wires WS, in Operation S17, test failures may be determined, and the test circuit 126 may generate a result signal RES corresponding to the test failures. On the other hand, as shown in FIG. 13, when no attack has been detected, i.e., when the random signal RS pass through the plurality of conducting wires WS normally and reach the receiving circuit 123, in Operation S18, a test pass may be determined, and the test circuit 126 may generate a result signal RES corresponding to the test pass. Then, in Operation S19, an operation of releasing the test mode may be performed, and the method of testing the active shield may be terminated.

Figure 14:
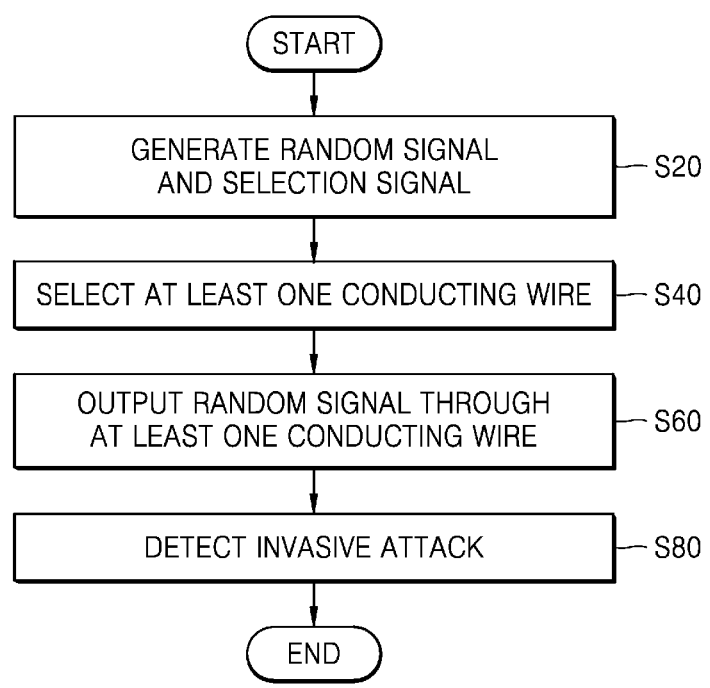
FIG. 14 is a flowchart illustrating an example of a method of protecting an apparatus from an invasive attack according to an embodiment of the inventive concept.

FIG. 14 is a flowchart illustrating an example of a method of protecting an apparatus from an invasive attack according to an embodiment of the inventive concept. In some embodiments, the method shown in FIG. 14 may be performed by the apparatus 10 of FIG. 1 and may also be referred to as a method of operating the active shield. As shown in FIG. 14, the method of protecting an apparatus from an invasive attack may include a plurality of operations S20, S40, S60, and S80, and hereinafter, FIG. 14 will be described with reference to FIG. 1.

In Operation S20, an operation of generating random signal and selection signal may be performed. For example, the signal generation circuit 11 may generate random numbers and may generate random signal and selection signal based on the random numbers. An example of Operation S20 will be described below with reference to FIG. 15.

In Operation S40, an operation of selecting at least one conducting wire may be performed. For example, the transmitting circuit 12 and the receiving circuit 13 may receive the selection signal commonly and may select at least one from among the plurality of conducting wires WS based on the selection signal. As described above with reference to FIG. 3, the transmitting circuit 12 and the receiving circuit 13 may include a plurality of pairs of a transmitting unit circuit and a receiving unit circuit and a pair of a transmitting unit circuit and a receiving unit circuit may select one from among conducting wires connected to themselves based on the selection signal. At least part of the plurality of conducting wires WS may be selected according to the selection signal generated by the random numbers so that the predictability of the signal passing through the plurality of conducting wires WS may be reduced and the conducting wires having the same electric potential from among the plurality of conducting wires may be removed. As a result, the difficulty of dismantling the active shield may increase.

In Operation S60, an operation of outputting random signal through at least one conducting wire may be performed. For example, the transmitting circuit 12 may output random signal through at least one conducting wire selected based on the selection signal. When no invasive attack has occurred, the random signal may arrive at the receiving circuit 13 normally, whereas when the invasive attack has occurred and at least part of the plurality of conducting wires WS may be open or shorted, the random signal may not normally arrive at the receiving circuit 13.

In Operation S80, an operation of detecting the invasive attack may be performed. For example, the receiving circuit 13 may receive inverted random signal (or random signal) and may generate detection signal based on the inverted random signal and signal received through at least one selected from among the plurality of conducting wires WS. An example of Operation S80 will be described with reference to FIG. 16.

Figure 15:
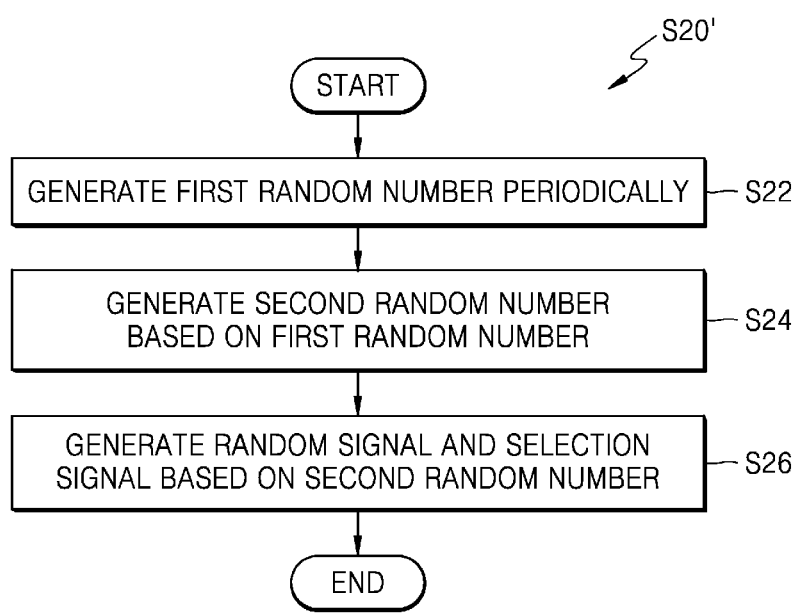
FIG. 15 is a flowchart illustrating an example of a method of protecting an apparatus from an invasive attack according to another embodiment of the inventive concept.

FIG. 15 is a flowchart illustrating an example of a method of protecting an apparatus from an invasive attack according to another embodiment of the inventive concept. In detail, the flowchart of FIG. 15 illustrates an example of Operation S20 of FIG. 14. As described above with reference to FIG. 14, in Operation S20' of FIG. 15, an operation of generating random signal and selection signal may be performed. In some embodiments, Operation S20' of FIG. 15 may be performed by the signal generation circuit 90 of FIG. 9. As shown in FIG. 15, Operation S20' may include a plurality of Operations S22, S24, and S26, and hereinafter, FIG. 15 will be described with reference to FIG. 9.

In Operation S22, an operation of generating a first random number RN1 periodically may be performed. For example, a true random number generator 91 of the signal generation circuit 90 may generate the first random number RN1 periodically. In some embodiments, as described above with reference to FIG. 9, an update period of the first random number RN1 may be relatively long.

In Operation S24, an operation of generating a second random number RN2 based on the first random number RN1 may be performed. For example, a first pseudo random number generator 92 of the signal generation circuit 90 may receive the first random number RN1 and may use the first random number RN1 as a seed, thereby generating a second random number RN2. In some embodiments, as described above with reference to FIG. 9, an update period of the second random number RN2 is adjustable.

In Operation S26, an operation of generating random signal and selection signal based on the second random number RN2 may be performed. For example, at least one second pseudo random number generator 93 of the signal generation circuit 90 may receive the second random number RN2 and may use at least part of the second random number RN2 as a seed, thereby generating a third random number RN3. The random signal and the selection signal may be configured of different parts of the third random number RN3. In some embodiments, as described above with reference to FIG. 9, at least one second pseudo random number generator 93 may adjust an update period of the third random number RN3 based on at least part of the second random number RN2.

Figure 16:
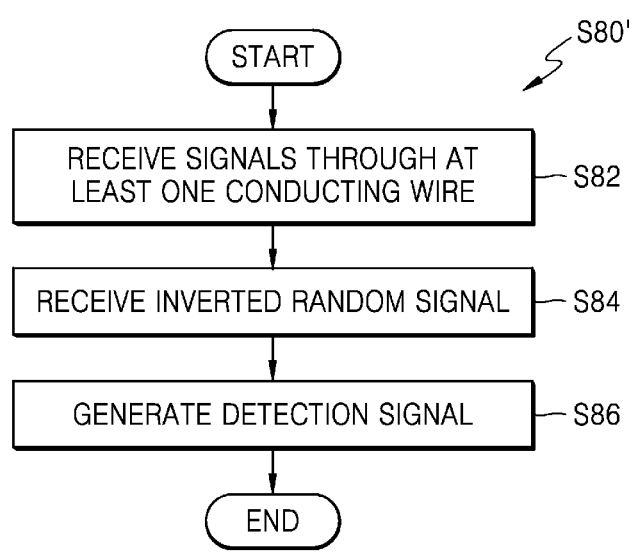
FIG. 16 is a flowchart illustrating an example of a method of protecting an apparatus from an invasive attack according to another embodiment of the inventive concept.

FIG. 16 is a flowchart illustrating an example of a method of protecting an apparatus from an invasive attack according to another embodiment of the inventive concept. In detail, the flowchart of FIG. 16 illustrates an example of Operation S80 of FIG. 14. As described above with reference to FIG. 14, in Operation S80' of FIG. 16, an operation of detecting an invasive attack may be performed. In some embodiments, Operation S80' of FIG. 16 may be performed by the receiving circuits 33 and 53 of FIGS. 3 and 5. As shown in FIG. 16, Operation S80' may include a plurality of Operations S82, S84, and S86, and hereinafter, FIG. 16 will be described with reference to FIG. 3.

In Operation S82, an operation of receiving signal through at least one conducting wire may be performed. For example, the receiving circuit 33 may receive the selection signal SEL commonly with the transmitting circuit 32 and may receive signal through at least one selected from among the plurality of conducting wires WS based on the selection signal SEL.

In Operation S84, an operation of receiving inverted random signal/RS may be performed. For example, the receiving circuit 33 may receive the inverted random signal/RS from the transmitting circuit 32 through the plurality of conductive patterns 35 disposed under the plurality of conducting wires WS. In some embodiments, as described above with reference to FIG. 5, the inverted random signal/RS may also be received from the signal generation circuit 31 through the plurality of conductive patterns 35 disposed under the plurality of conducting wires WS.

In Operation S86, an operation of generating detection signal DET may be performed. For example, the receiving circuit 33 may include first through n-th receiving unit circuits RX1 through RXn, and each of the first through n-th receiving unit circuits RX1 through RXn may compare the signal received through one conducting wire selected to one bit of the inverted random signal/RS, thereby generating each of first through n-th detection signals DET1 through DETn. In some embodiments, the first through n-th detection signals DET1 through DETn may be directly provided to the security-critical circuit (for example, 14 of FIG. 1). In some embodiments, as described above with reference to FIGS. 7, 8A and 8B, the receiving circuit 33 may generate detection signal DET' from the first through n-th detection signals DET1 through DETn and may also provide the detection signal DET' to the security-critical circuit (for example, 14 of FIG. 1).

While the inventive concept has been particularly shown and described with reference to embodiments thereof, it will be understood that various changes in form and details may be made therein without departing from the spirit and scope of the following claims.

What is claimed is:

1. An apparatus, comprising:
    an integrated circuit having a plurality of conducting wires thereon, which includes a plurality of first conducting wires, said integrated circuit comprising:
        a signal generation circuit configured to generate a random signal and a selection signal based on random or pseudo-random numbers,
        a transmitting circuit configured to select at least one of the plurality of conducting wires based on the selection signal, and output the random signal via the selected at least one of the plurality of conducting wires, said transmitting circuit comprising a first transmitting unit circuit configured to: (i) select one from amount the plurality of first conducting wires based on the selection signal, and (ii) output a first bit of the random signal through the selected one of the first conducting wires; and
        a receiving circuit configured to detect an invasive attack on the integrated circuit based on a signal(s) received through the selected at least one of the plurality of conducting wires, said receiving circuit comprising a first receiving unit circuit configured to: (i) select one from among the plurality of first conducting wires based on the selection signal, and (ii) detect the invasive attack based on a bit signal received through the selected one of the first conducting wires.

2. The apparatus of claim 1,
    wherein the plurality of conducting wires comprise a plurality of second conducting wires;
    wherein the transmitting circuit comprises a second transmitting unit circuit configured to select one from among the plurality of second conducting wires based on the selection signal, and output a second bit of the random signal through the selected one of the second conducting wires; and
    wherein the receiving circuit comprises a second receiving unit circuit configured to select one from among the plurality of second conducting wires based on the selection signal, and detect the invasive attack based on a bit signal received through the selected one of the second conducting wires.

3. The apparatus of claim 2,
    wherein the transmitting circuit and the receiving circuit face each other in a first direction; and
    wherein the first transmitting unit circuit, the first receiving unit circuit, the second transmitting unit circuit, and the second receiving unit circuit have the same length in a second direction perpendicular to the first direction.

4. The apparatus of claim 1, wherein the first receiving unit circuit is configured to receive a first bit signal corresponding to the first bit of the random signal or a first inverted bit signal generated by inverting the first bit signal, and generate a first detection signal by comparing the bit signal received through the selected first conducting wire to the first bit signal or the first inverted bit signal.

5. The apparatus of claim 4,
    wherein the receiving circuit further comprises a third receiving unit circuit and a fourth receiving unit circuit, which are disposed at both sides of the first receiving unit circuit to be adjacent to each other and to have the same structure as the first receiving unit circuit; and
    wherein the first receiving unit circuit is configured to generate a second accumulated signal based on a first accumulated detection signal received from the third receiving unit circuit and the first detection signal and to provide the second accumulated detection signal to the fourth receiving unit circuit.

6. The apparatus of claim 1,
    wherein the first transmitting unit circuit is configured to select another one from among the plurality of first conducting wires based on the selection signal, and output an inverted bit signal of the first bit of the random signal through the other selected first conducing wire; and
    wherein the first receiving unit circuit is configured to select another one from among the plurality of first conducting wires based on the selection signal, and detect the invasive attack further based on bit signal received through the other selected first conducing wire.

7. The apparatus of claim 1, further comprising a plurality of conductive patterns connected to the transmitting circuit and the receiving circuit under the plurality of conducting wires; and wherein the transmitting circuit is configured to output the random signal or inverted random signal generated by inverting the random signal through the plurality of conductive patterns.

8. The apparatus of claim 1, wherein the signal generation circuit is configured to provide the random signal to the transmitting circuit and to provide the random signal or inverted random signal generated by inverting the random signal to the receiving circuit.

9. The apparatus of claim 1, further comprising a hacking detection circuit configured to detect an invasive attack on the integrated circuit; and wherein the signal generation circuit is configured to adjust an update period of the random signal and/or the selection signal based on an output signal of the hacking detection circuit.

10. The apparatus of claim 1, wherein the integrated circuit further comprises a test circuit configured to release a test mode when the invasive attack has not been detected by the receiving circuit in the test mode.

11. The apparatus of claim 1, wherein the transmitting circuit is configured to float unselected conducting wires from among the plurality of conducting wires or to apply a uniform electric potential to the unselected conducting wires.

12. The apparatus of claim 1, wherein the transmitting circuit comprises a plurality of demultiplexers therein, which are each configured to select one from among the plurality of first conducting wires based on the selection signal and to output one bit of the random signal through the selected first conducting wire, and wherein the receiving circuit comprises a plurality of multiplexers, which are each configured to select one from among the plurality of first conducting wires and to output a signal(s) received through a selected one of the plurality of first conducting wires.

13. An apparatus, comprising:
an integrated circuit having a plurality of conducting wires thereon, said integrated circuit comprising:
 a signal generation circuit configured to generate a random signal and a selection signal based on random or pseudo-random numbers;
 a transmitting circuit configured to select at least one of the plurality of conducting wires based on the selection signal, and output the random signal via the selected at least one of the plurality of conducting wires; and
 a receiving circuit configured to detect an invasive attack on the integrated circuit based on a signal(s) received through the selected at least one of the plurality of conducting wires;
 wherein the signal generation circuit comprises a first random number generator configured to periodically generate a first random number, and a second random number generator configured to generate a second random number based on the first random number; and
 wherein the random signal and the selection signal are generated based on the second random number.

14. The apparatus of claim 13, wherein the first random number generator comprises a true random number generator; and wherein the second random number generator comprises a pseudo random number generator configured to use the first random number as a seed.

15. The apparatus of claim 13, further comprising at least one third random number generator configured to generate a third random number by using at least part of the second random number as a seed; and wherein each of the random signal and the selection signal utilize different bits of the third random number.

16. The apparatus of claim 15, wherein the at least one third random number generator is configured to update the third random number based on at least part of the second random number.

17. An apparatus, comprising:
an integrated circuit having a plurality of conducting wires thereon, said integrated circuit comprising:
 a signal generation circuit configured to generate a random signal and a selection signal based on random or pseudo-random numbers;
 a transmitting circuit configured to select at least one of the plurality of conducting wires based on the selection signal, and output the random signal via the selected at least one of the plurality of conducting wires; and
 a receiving circuit configured to detect an invasive attack on the integrated circuit based on a signal(s) received through the selected at least one of the plurality of conducting wires;
 wherein the plurality of conducting wires comprise a first group disposed on a first layer and a second group disposed on a second layer;
 wherein the first group of conducting wires and the second group of conducting wires have the same pitch; and
 wherein the first group of conducting wires is disposed in a center of adjacent conducting wires of the second group.

18. The apparatus of claim 13, wherein the transmitting circuit comprises a plurality of demultiplexers therein, which are each configured to select one from among the plurality of conducting wires based on the selection signal and to output one bit of the random signal through the selected conducting wire, and wherein the receiving circuit comprises a plurality of multiplexers, which are each configured to select one from among the plurality of conducting wires and to output a signal(s) received through a selected one of the plurality of conducting wires.

19. The apparatus of claim 17, wherein the transmitting circuit comprises a plurality of demultiplexers therein, which are each configured to select one from among the plurality of conducting wires based on the selection signal and to output one bit of the random signal through the selected conducting wire, and wherein the receiving circuit comprises a plurality of multiplexers, which are each configured to select one from among the plurality of conducting wires and to output a signal(s) received through a selected one of the plurality of conducting wires.

* * * * *